(12) United States Patent
Sawano

(10) Patent No.: US 6,384,895 B1
(45) Date of Patent: *May 7, 2002

(54) IMAGE CORRECTION METHOD

(75) Inventor: Mitsuru Sawano, Shizuoka (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,928

(22) Filed: Jan. 12, 1999

(30) Foreign Application Priority Data

Jan. 12, 1998 (JP) ............................................ 10-004081

(51) Int. Cl.[7] .......................... G03B 27/52; H04N 1/46; H04N 1/21; B41J 2/355
(52) U.S. Cl. ........................ 355/40; 358/501; 358/296; 347/183
(58) Field of Search .......................... 347/111, 18, 183; 358/462, 518, 501, 296; 395/103, 109; 382/167; 355/40; 346/1.1; 345/431, 591

(56) References Cited

U.S. PATENT DOCUMENTS

| | | | | |
|---|---|---|---|---|
| 4,989,079 A | * | 1/1991 | Ito ................................ 358/80 |
| 5,075,698 A | * | 12/1991 | Aoki et al. ................... 346/1.1 |
| 5,235,436 A | * | 8/1993 | Sakamoto et al. ........... 358/462 |
| 5,512,924 A | * | 4/1996 | Takada et al. ................. 347/18 |
| 5,642,439 A | * | 6/1997 | Sato et al. ................... 382/254 |
| 5,784,065 A | * | 7/1998 | Kakutani ..................... 345/431 |
| 5,978,555 A | * | 11/1999 | Inoue .......................... 395/109 |

FOREIGN PATENT DOCUMENTS

| | | | |
|---|---|---|---|
| JP | 7-117359 | 5/1995 | ............. B41M/5/30 |
| JP | 2608808 | 2/1997 | ........... H04N/1/405 |

* cited by examiner

*Primary Examiner*—Russell Adams
*Assistant Examiner*—Peter B. Kim
(74) *Attorney, Agent, or Firm*—Sughrue Mion, PLLC

(57) ABSTRACT

An image correction method structured such that supplied image data is converted into image data which must be output when supplied image data is output by a printing apparatus including a line-type head, the image correction method including steps of performing: CMS-conversion (21) of supplied image data in three dimensional or higher order; increase (30) of a gradation accuracy of image data after the CMS conversion has been performed; a correction process (31) of image data having the increased gradation accuracy; and a multivalued dither process (32).

18 Claims, 19 Drawing Sheets

FIG. 3 (A)
CORRESPONDENCE TABLE BETWEEN K-CMY-MEASURED VALUE
| SET VALUES | | | | MEASURED VALUES | | |
|---|---|---|---|---|---|---|
| VALUE OF K | VALUES OF CMY | | | R | G | B |
| $K(1)$ | $C(1)$ | $M(1)$ | $Y(1)$ | $R_1$ | $G_1$ | $B_1$ |
| $K(2)$ | $C(2)$ | $M(2)$ | $Y(2)$ | $R_2$ | $G_2$ | $B_2$ |
| ⋮ | ⋮ | ⋮ | ⋮ | ⋮ | ⋮ | ⋮ |
| $K(n)$ | $C(n)$ | $M(n)$ | $Y(n)$ | $R_n$ | $G_n$ | $B_n$ |
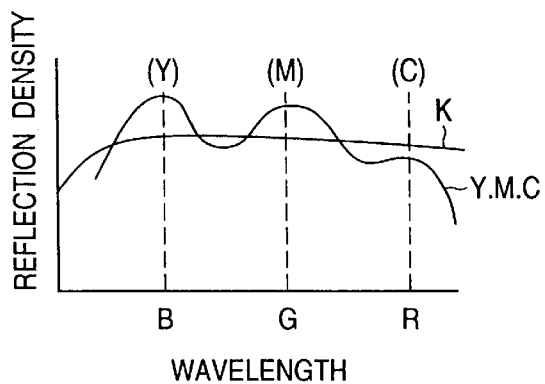
FIG. 3 (B)
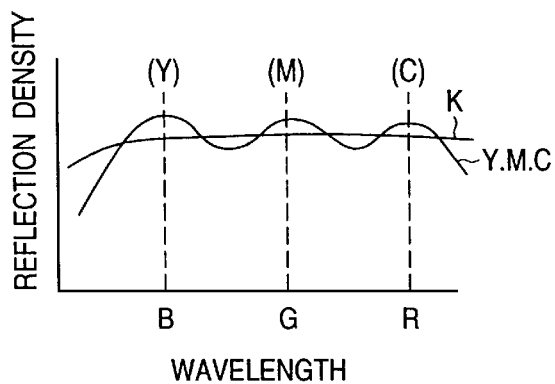
FIG. 3 (C)

FIG. 8

| SUPPLIED ENERGY | | ORIGINAL IMAGE | | REPRODUCTION DOT % | CALIBRATION CHART |
|---|---|---|---|---|---|
| GRADATION VALUE | G.V. PERCENT | GRADATION VALUE | G.V. PERCENT | | |
| 0 | 0.0 | | | | |
| 4 | 0.4 | | | | |
| 8 | 0.8 | | | | |
| 12 | 1.2 | | | | |
| 16 | 1.6 | 0 | 0.0 | 0.0 | ● |
| 20 | 2.0 | | | | |
| 24 | 2.4 | | | | |
| 28 | 2.7 | | | | |
| ≀ | ≀ | | | | |
| 108 | 10.6 | | | | |
| 112 | 11.0 | | | | |
| 116 | 11.4 | | | | ● |
| 120 | 11.8 | | | | |
| 124 | 12.2 | | | | |
| 128 | 12.5 | | | | |
| 132 | 12.9 | | | | |
| 136 | 13.3 | | | | |
| 140 | 13.7 | | | | ● |
| 144 | 14.1 | | | | |
| 148 | 14.5 | | | | |
| 152 | 14.9 | | | | |
| 156 | 15.3 | | | | |
| 160 | 15.7 | 4 | 0.4 | 0.7 | ● |
| 164 | 16.1 | 8 | 0.9 | 1.6 | |
| 168 | 16.5 | 12 | 1.4 | 2.4 | |
| 172 | 16.9 | 20 | 1.9 | 3.3 | ● |
| 176 | 17.3 | 24 | 2.3 | 4.2 | |
| 180 | 17.6 | 28 | 2.8 | 5.0 | |
| 184 | 18.0 | 32 | 3.3 | 5.9 | |
| 188 | 18.4 | 40 | 3.8 | 6.8 | ● |
| 192 | 18.8 | 44 | 4.3 | 7.6 | |
| 196 | 19.2 | 48 | 4.8 | 8.5 | |
| 200 | 19.6 | 52 | 5.3 | 9.3 | |
| 204 | 20.0 | 60 | 5.8 | 10.2 | ● |
| 208 | 20.4 | 64 | 6.3 | 11.1 | |
| 212 | 20.8 | 68 | 6.7 | 11.9 | |
| 216 | 21.2 | 72 | 7.2 | 12.8 | |
| 220 | 21.6 | 80 | 7.7 | 13.7 | |
| 224 | 22.0 | 84 | 8.2 | 14.5 | |
| 228 | 22.4 | 88 | 8.7 | 15.4 | |
| 232 | 22.7 | 92 | 9.2 | 16.3 | |
| 236 | 23.1 | 100 | 9.7 | 17.1 | |
| 240 | 23.5 | 104 | 10.2 | 18.0 | |
| 244 | 23.9 | 108 | 10.7 | 18.8 | |
| 248 | 24.3 | 112 | 11.1 | 19.6 | ● |
| 252 | 24.7 | 120 | 11.6 | 20.4 | |
| ≀ | ≀ | ≀ | ≀ | ≀ | |
| 316 | 31.0 | 200 | 19.5 | 32.5 | |
| 320 | 31.4 | 204 | 19.9 | 33.2 | ● |
| 324 | 31.8 | 208 | 20.4 | 33.9 | |
| ≀ | ≀ | ≀ | ≀ | ≀ | |

FIG. 9

| | | | | | | |
|---|---|---|---|---|---|---|
| 396 | 38.8 | 300 | 29.2 | 45.7 | | |
| 400 | 39.2 | 304 | 29.7 | 46.3 | ● | |
| 404 | 39.6 | 308 | 30.2 | 46.9 | | |
| ≀ | ≀ | ≀ | ≀ | ≀ | | |
| 476 | 46.7 | 396 | 39.0 | 57.5 | | |
| 480 | 47.1 | 404 | 39.5 | 58.0 | ● | |
| 484 | 47.5 | 408 | 40.0 | 58.6 | | |
| ≀ | ≀ | ≀ | ≀ | ≀ | | |
| 556 | 54.5 | 496 | 48.8 | 68.3 | | |
| 560 | 54.9 | 504 | 49.3 | 68.7 | ● | |
| 564 | 55.3 | 508 | 49.8 | 69.1 | | |
| ≀ | ≀ | ≀ | ≀ | ≀ | | |
| 636 | 62.4 | 596 | 58.6 | 76.6 | | |
| 640 | 62.7 | 604 | 59.0 | 77.0 | ● | |
| 644 | 63.1 | 608 | 59.5 | 77.3 | | |
| ≀ | ≀ | ≀ | ≀ | ≀ | | |
| 716 | 70.2 | 696 | 68.3 | 83.3 | | |
| 720 | 70.6 | 700 | 68.8 | 83.7 | ● | |
| 724 | 71.0 | 708 | 69.3 | 84.0 | | |
| ≀ | ≀ | ≀ | ≀ | ≀ | | |
| 796 | 78.0 | 796 | 78.1 | 89.7 | | |
| 800 | 78.4 | 800 | 78.6 | 90.0 | ● | |
| 804 | 78.8 | 808 | 79.1 | 90.4 | | |
| ≀ | ≀ | ≀ | ≀ | ≀ | | |
| 876 | 85.9 | 896 | 87.9 | 94.6 | | |
| 880 | 86.3 | 900 | 88.4 | 94.8 | ● | |
| 884 | 86.7 | 908 | 88.9 | 95.0 | | |
| ≀ | ≀ | ≀ | ≀ | ≀ | | |
| 936 | 91.8 | 972 | 95.2 | 98.5 | | |
| 940 | 92.2 | 976 | 95.7 | 98.7 | ● | |
| 944 | 92.5 | 980 | 96.2 | 98.8 | | |
| 948 | 92.9 | 988 | 96.7 | 99.0 | | |
| 952 | 93.3 | 992 | 97.2 | 99.2 | | |
| 956 | 93.7 | 996 | 97.7 | 99.3 | ● | |
| 960 | 94.1 | 1000 | 98.1 | 99.5 | | |
| 964 | 94.5 | 1008 | 98.6 | 99.6 | | |
| 968 | 94.9 | 1012 | 99.1 | 99.8 | | |
| 972 | 95.3 | 1016 | 99.6 | 99.9 | ● | |
| 976 | 95.7 | 1020 | | | | |
| 980 | 96.1 | 1020 | | | | |
| 984 | 96.5 | 1020 | | | | |
| 988 | 96.9 | 1020 | | | | |
| 992 | 97.3 | 1020 | | | | |
| 996 | 97.6 | 1020 | 100.0 | 100.0 | ● | YMC |
| 1000 | 98.0 | 1020 | | | | |
| 1004 | 98.4 | 1020 | | | | |
| 1008 | 98.8 | 1020 | | | | |
| 1012 | 99.2 | 1020 | | | | |
| 1016 | 99.6 | 1020 | | | | |
| 1020 | 100.0 | 1020 | 100.0 | 100.0 | | K |

FIG. 10

DENSITY CALIBRATION CHART

| IDENTIFICATION NO. | HALF TONE % | EXAMPLES |
|---|---|---|
| A (MAXIMUM DENSITY) | 100 % | 1020 |
| B (MAXIMUM DENSITY) | 0 % | 16 |
| 1 | 100 % | 996 |
| 2 | 99.9 % | 972 |
| 3 | 99.3 % | 956 |
| 4 | 98.7 % | 940 |
| 5 | 95.0 % | 880 |
| 6 | 90.0 % | 800 |
| 7 | 83.7 % | 720 |
| 8 | 77.0 % | 640 |
| 9 | 68.7 % | 560 |
| 10 | 58.0 % | 480 |
| 11 | 46.3 % | 400 |
| 12 | 33.2 % | 320 |
| 13 | 19.8 % | 248 |
| 14 | 10.2 % | 204 |
| 15 | 6.8 % | 188 |
| 16 | 3.3 % | 172 |
| 17 | 0.7 % | 160 |
| 18 | 0 % | 140 |
| 19 | 0 % | 120 |

FIG. 18

GRADATION VALUE

|  | 0 | 1 | 2 | 3 | 4 | ..... |  |  |  | ..... | 4092 |
|---|---|---|---|---|---|---|---|---|---|---|---|
| 0 | 0 | 3 | 7 | 11 | 15 | ..... |  |  |  |  | 4092 |
| 1 | 0 | 4 | 8 | 12 | 16 | ..... |  |  |  |  |  |
| 2 | 0 | 4 | 8 | 12 | 16 | ..... |  |  |  |  |  |
| 3 | 0 | 5 | 10 | 15 | 20 | ..... |  |  |  |  |  |
| 4 | 0 | 4 | 8 | 12 | 16 | ..... |  |  |  |  |  |
| 5 | 0 | 3 | 6 | 10 | 14 | ..... |  |  |  |  |  |
| ⋮ |  | ⋮ | ⋮ | ⋮ | ⋮ | GRADATION CORRECTION VALUE |  |  |  |  |  |
| 7615 | 0 |  |  |  |  |  |  |  |  |  | 4092 |

POSITION OF HEAT RESISTOR

FIG. 19 p

|  |  | 0 | 1 | 2 | 3 |
|---|---|---|---|---|---|
| a | 0 | 0 | 3 | 1 | 2 |
|  | 1 | 3 | 2 | 0 | 1 |
|  | 2 | 1 | 0 | 2 | 3 |
|  | 3 | 2 | 1 | 3 | 0 |

FIG. 23

BK — MAIN SCANNING DIRECTION 600dpi →

SUB-SCANNING DIRECTION 1200dpi ↓

| 1 | 0 | 16 | 0 |
|---|---|----|---|
| 0 | 12 | 0 | 8 |
| 13 | 0 | 4 | 0 |
| 0 | 5 | 0 | 9 |
| 3 | 0 | 14 | 0 |
| 0 | 10 | 0 | 6 |
| 15 | 0 | 2 | 0 |
| 0 | 7 | 0 | 11 |

FIG. 24

C — MAIN SCANNING DIRECTION 600dpi →

SUB-SCANNING DIRECTION 900dpi ↓

| 1 | 0 | 4 | 0 |
|---|---|---|---|
| 0 | 7 | 0 | 10 |
| 5 | 0 | 2 | 0 |
| 0 | 11 | 0 | 8 |
| 3 | 0 | 6 | 0 |
| 0 | 9 | 0 | 12 |

FIG. 25

M — MAIN SCANNING DIRECTION 600dpi →

SUB-SCANNING DIRECTION 600dpi ↓

| 1 | 0 | 5 | 0 |
|---|---|---|---|
| 0 | 3 | 0 | 7 |
| 6 | 0 | 2 | 0 |
| 0 | 8 | 0 | 4 |

IMAGE CORRECTION METHOD

BACKGROUND OF THE INVENTION

1. Field of the Invention

The present invention relates to a method of correcting image data which is employed when an image is printed, and more particularly to a technique for preventing deterioration in the image quality which occurs when a correction process is performed.

The present application is based on Japanese Patent Application No. Hei. 10-4081, which is incorporated herein by reference.

2. Description of the Related Art

In recent years, printing apparatuses, such as thermal transfer printers and laser beam printers, have widely been used as image output terminals for personal computers and work stations. Printing apparatuses of the foregoing type structured to output image data, such as characters and line drawings, must be capable of accurately and quickly outputting an image having multiple gradation.

Therefore, an image has usually been output such that original image data is subjected to a plurality of correction processes to produce final image data which must be printed.

When an image is printed by a printing apparatus of the foregoing type, a command to output an image is issued from an application which is being executed by, for example, a client computer. In accordance with the command to output an image, image data which must be printed is subjected to a correction process and a dither process. That is, the correction process and so forth are basically performed with the gradation accuracy (for example, 256 levels) of original data.

FIG. 26 shows a block diagram showing steps of an image correction process according to the related art. Referring to FIG. 26, a RIP machine performs density calibration correction 261. A printer engine performs correction of irregular densities in a main scanning direction, a process 262 for correcting the difference between the temperature of the right portion of the head and that of the left portion of the head and a multivalued dither process 263. Thus, when strobe width conversion 264 is performed, correction including correction of the difference in the environmental temperature has been performed.

When the correction process is performed with the gradation accuracy of original data, the correction accuracy is however limited by the gradation accuracy (the number of gradation is 8 bits, that is, 256 gradation). Therefore, the correction accuracy has a limitation to $\frac{1}{255}$. Hence, the steps of the densities of printing caused from gradation skip of $\frac{1}{255}$ sometimes appear on the corrected image.

The foregoing gradation skip can be prevented when the number of gradation of image data is enlarged from, for example, original 256 levels to 1024 levels. Moreover, the 1024-level image data is subjected to a correction process. Thus, the gradation skip can be prevented. Although the gradation skip can be prevented if the number of the gradation is enlarged, the line-type head must be controlled delicately. In the foregoing case, there arise problems in that the image reproducibility deteriorates and in that the image recording speed when the image is formed is reduced.

SUMMARY OF THE INVENTION

In view of the foregoing, an object of the present invention is to prevent gradation skips caused from a data correction process which is a combination of a correction process, which is performed by a printer engine, and a multivalued dither process without a necessity of improving the control accuracy of the line-type head and reduction in the recording speed.

To achieve the above-mentioned object, according to one aspect of the present invention, there is provided an image correction method structured such that supplied image data is converted into image data which must be output when supplied image data is output by a printing apparatus including a line-type head, the image correction method comprising: a step for CMS-converting supplied image data in three dimensional or higher order; a step for increasing gradation accuracy of image data after the CMS conversion has been performed; a step for performing a process of correcting image data, the gradation accuracy of which has been increased; a step for performing a multivalued dither process; and a step for converting processed image data into a strobe signal with which the line-type head is controlled.

As a result, image data having an increased gradation accuracy can be subjected to the correction process. Since the gradation width can be fined, correction errors can be decreased. Therefore, the gradation skips caused from the data correction process can considerably be reduced.

It is preferable that the correction process includes any one of main-scanning-directional density irregularity correction for correcting irregular density in a main scanning direction of the line-type head, density calibration correction, and head right-and-left temperature difference correction for correcting change in the printing density occurring by dint of the temperature difference between the right and left of the line-type head.

It is preferable that the multivalued dither process is performed to record the gradation by converting input image data into recording dots having different sizes, and the conversion of the density level of image data into the size of the recording dot is performed such that at least five lines of characteristic curves of a gradation conversion table indicating the relationship between gradation values and energy for forming the recording dot are set, at least three types of energy values which are not maximum or minimum energy at a predetermined gradation value are set for a half tone image, and the number of printing points having substantially minimum energy is set to be not smaller than half of the number of all of printing points at a minimum gradation value at which a printing point having substantially maximum energy exists.

The image correction method according to the present invention has the structure that at least five lines of characteristic curves of a gradation conversion table indicating the relationship between gradation values and energy for forming the recording dot are set. Moreover, at least three types of energy values which are not maximum or minimum energy at a predetermined gradation value are set for a half tone image. Therefore, smooth continuous gradation value can be obtained. Moreover, the number of printing points having substantially minimum energy is set to be not smaller than half of the number of all of printing points at a minimum gradation value at which a printing point having substantially maximum energy exists. Therefore, even if a low density pixel is recorded on white portion, rough surfaces can considerably be reduced.

The description "substantially maximum" means a structure that the energy of the characteristic curve at the maximum gradation value at each color which must be printed is raised as compared with the energy of the characteristic curve at the other gradation value. The foregoing structure is effective to improve the collapse characteristic of a "solid" image.

It is preferable that power supply voltage which is supplied to the line-type head is corrected in accordance with the atmosphere including the temperature and humidity.

It is preferable that a plurality of gray charts including a first gray pattern formed by C, M and Y and a second gray pattern formed by K in such a manner that a required color tone of the first gray pattern is realized and corresponding to different densities are prepared, the density of each gray chart is read by a color scanner to measure characteristics of reflection intensities with respect to wavelengths, and a CMS table to which a reference is made when the CMS conversion is performed is corrected in accordance with the obtained characteristics of the reflection intensities.

It is preferable that the main-scanning-directional density irregularity correction is performed such that an elongated pattern having a predetermined gradation value is printed in the main scanning direction of the line-type head, aligning a main scanning direction of a line sensor to a sub-scanning direction of the line-type head, and the line sensor is relatively moved in the main scanning direction of the line-type head so that the density of the printed elongated pattern is detected, correction conditions for the positions of pixels are obtained in accordance with the detected densities of printing and the predetermined gradation value, and image data which must be output is corrected in accordance with the correction conditions.

When the above-mentioned image correction method is combined with a recording material having a thin ink layer, a further satisfactory effect can be obtained. The foregoing recording material is exemplified by the following material disclosed in Unexamined Japanese Patent Publication No. 7-117359.

The recording material is a thermal transfer recording material is employed which includes a substantially transparent thermosensitive ink layer which contains 30 parts by weight of pigment and 25 parts by weight to 60 parts by weight of organic amorphous high molecular-weight polymers having a softening point of 40° C. to 150° C. and which has a thickness of 0.2 $\mu$m to 1.0 $\mu$m, 70% or more pigment in the thermosensitive ink layer has a particle size of 1.0 $\mu$m or greater, and an optical reflection density of a transferred image on a white support member is not smaller than 1.0.

BRIEF DESCRIPTION OF THE DRAWINGS

FIGS. 3(a) to 3(c) show the relationship between value of K and values of C, M and Y;

FIGS. 6(A) and 6(B) are graphs showing the relationship of a reproducible dot percents with respect to supplied images, in which FIG. 6(A) shows required values and FIG. 6(B) is a graph showing the relationship of the reproducible dot percents with respect to designed gradation values for use in the embodiment;

FIGS. 7(A) and 7(B) are graphs showing the relationship between the reproducible dot percent with respect to supplied energy, in which FIG. 7(A) shows the relationship realized by a conventional structure and FIG. 7(B) is a diagram for use in the embodiment;

FIG. 8 shows a first page of a density calibration table for realizing the correction process according to the embodiment;

FIG. 9 shows a second page of the density calibration table for realizing the correction process according to the embodiment;

FIG. 10 is a density calibration chart;

FIG. 18 shows the contents of the correction value table in an intermediate process;

FIG. 19 shows the contents of a matrix of values which must be added;

FIG. 23 shows matrices showing energy conversion curves of B and K which must be selected;

FIG. 24 shows matrices showing energy conversion curves of C which must be selected;

FIG. 25 shows matrices showing energy conversion curves of M which must be selected.

DETAILED DESCRIPTION OF THE PREFERRED EMBODIMENT

Figure 1:
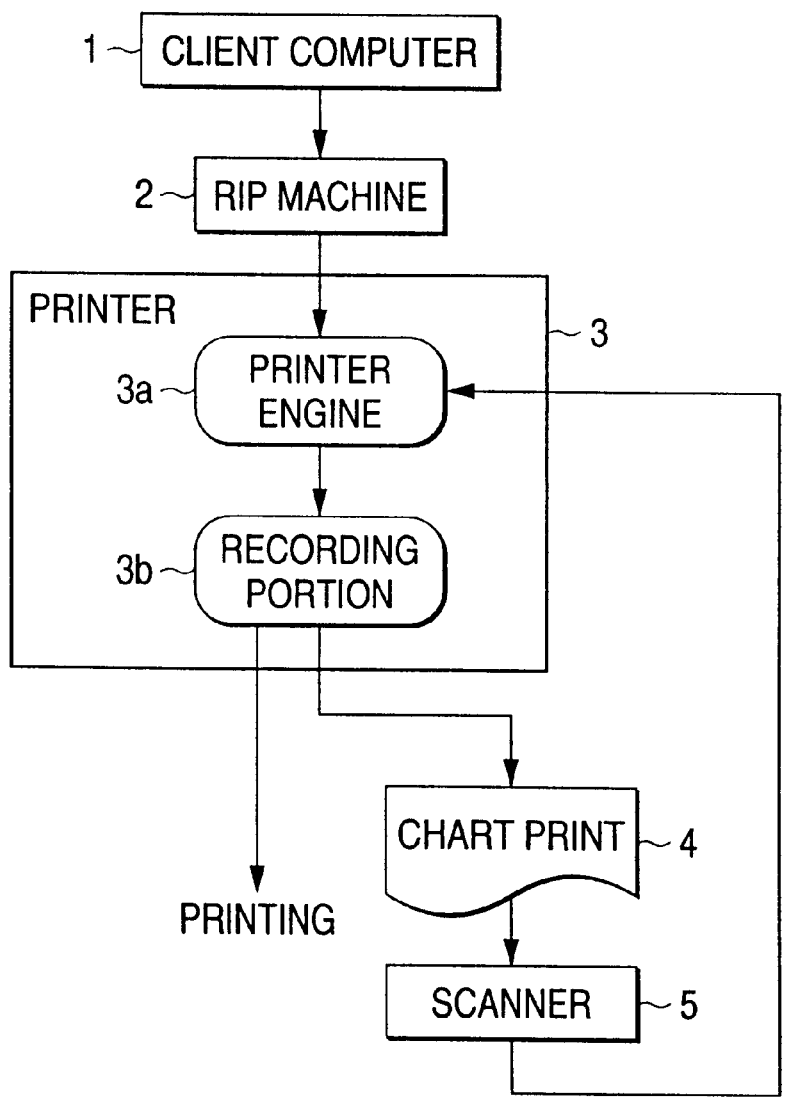
FIG. 1 is a diagram showing a system for performing an image correction process according to an embodiment of the present invention.
Figure 2:
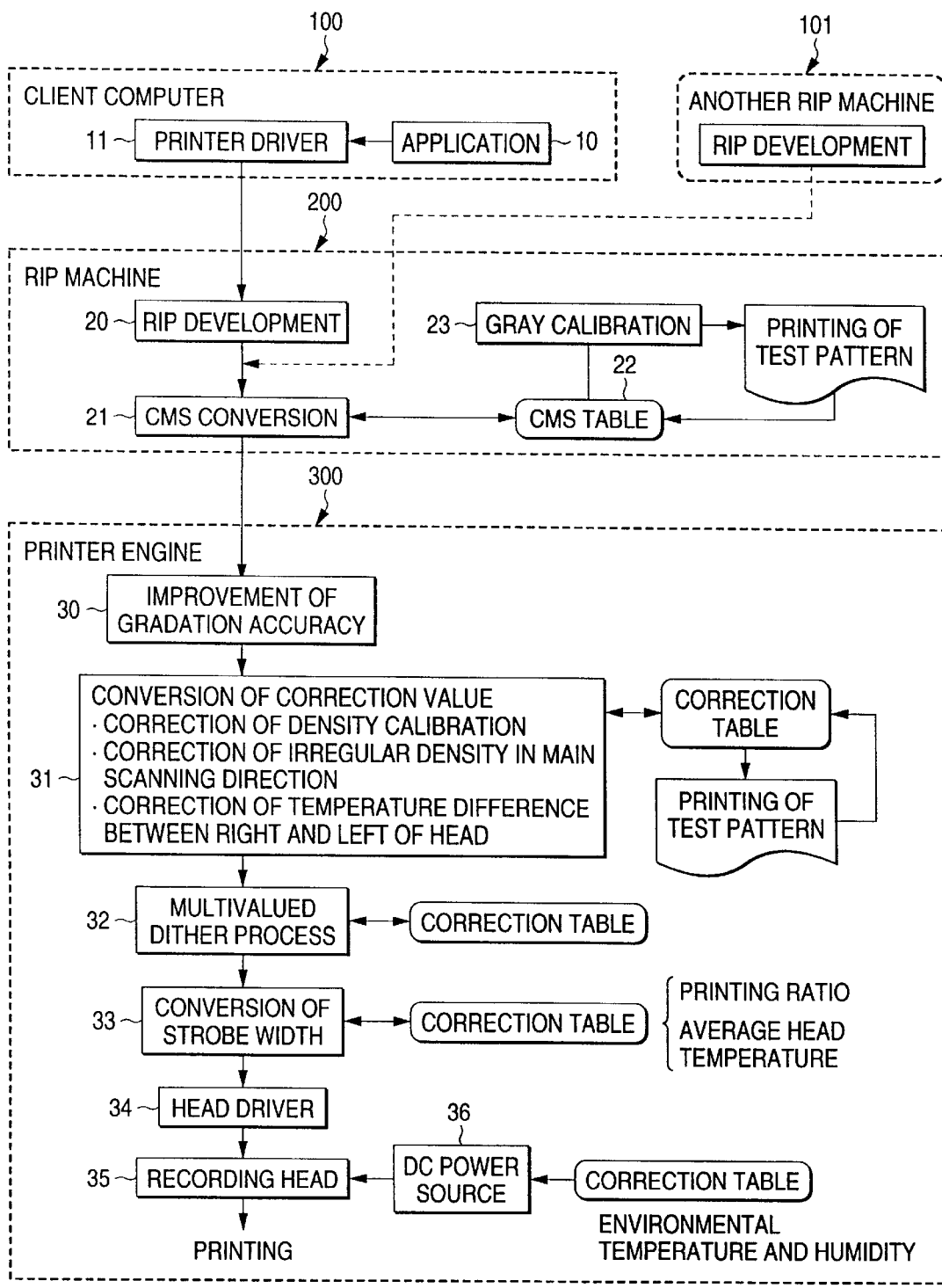
FIG. 2 is a block diagram showing steps of the image correction process according to the present invention.

An embodiment of the present invention will now be described with reference to FIGS. 1 to 25. FIG. 1 is a diagram showing the system for performing an image correction process according to the embodiment of the present invention. FIG. 2 is a block diagram showing steps of an image correction method.

The schematic process for printing an image according to this embodiment will now be described with reference to FIG. 1. Initially, image data supplied from a client computer 1 is RIP-developed by a RIP (Raster Image Processor), for example, a work station. A predetermined chart which is set by a printer engine 3a of a printer 3 is printed by a recording portion 3b. The printing density of the printed chart 4 is measured by a scanner 5 so that a result of the measurement is fed back to the printer engine 3a. As a result, a correction table in the printer engine 3a is modified so that image data is corrected. Finally, corrected image data is printed.

The present invention is characterized in that the combination of the correction process which is performed by the printer engine and the multivalued dither process to considerably reduce the gradation skips caused from bit steps which occur when the data correction process is performed.

The correction method according to the present invention will specifically be described with reference to FIG. 2. The image correction method according to this embodiment comprises three stages. A first stage 100 is a step which must be performed by a client computer to select an image which must be printed. A second stage 200 is a step for performing RIP development of the image and so forth on a RIP machine. A third stage 300 is a step which is performed by the printer engine in the printing apparatus.

The stages will sequentially be described. In the first stage 100, a user executes an application 10 on the client computer to cause the application 10 to issue a command to output an image. Thus, image data which must be printed is PS (Post Script) converted by a printer driver 11.

In the second stage 200, the RIP machine performs RIP development 20 of PS-converted image data supplied from the first stage 100 so that image data is formed into a bit map image at a resolution of 604.8×604.8 dpi. As a matter of course, image data may be converted into Y, M and C. However, the description will be performed about a structure in which image data is converted into four colors.

To make the color indicated by image data to match an actual hue, the gradation value of each of C, M, and Y is subjected to CMS conversion 21. The CMS conversion 21 is performed by a three-dimensional matrix calculation. A result of the conversion is stored in a CMS table 22. As an alternative to this, a four-dimensional matrix calculation may be performed to convert C, M, Y and K.

In place of supply of image data from the client computer, the CMS conversion may be performed such that RIP-converted image data is supplied form another RIP machine 101.

Simultaneously with the CMS conversion 20, calibration 23 for gray level is performed to correct the CMS table 22 produced when the CMS conversion has been performed. Thus, image data is updated. A method of calibration for the gray level will now be described.

In general, when C, M and Y are mixed, gray color can be created. The gray color created by the mixture of C, M and Y and gray color created by color-developing K are sometimes different from each other in actual printing hue even if the gradation level is the same. Therefore, if the two colors have the gradation values with which the same hue is realized, color balance is corrected by the gray level calibration in such a manner that the printing hues are the same.

Specifically, a plurality of combinations of printed matter formed by color-developing K and those formed by mixing C, M and Y which have the same printed hues are prepared. Then, the relationship between values of k and values of C, M and Y is previously formed into a table (or an expression), as shown in FIG. 3(a). Printed matter caused to have a predetermined hue is read by a color scanner. Then, an output of the scanner is matched with the predetermined hue by correcting the CMS table in accordance with the above-mentioned table. For example, distribution of reflection intensities of the printed matter obtained by color-developing Y, M and C shown in FIG. 3(b) is realized such that the reflection densities are raised at the wavelength positions of B and G and the reflection density at the wavelength position of R is low as compared with distribution realized by the color development of K. Therefore, the foregoing color balance must be corrected by setting the reflection densities of B and G to be lowered. Moreover, the reflection density of R is raised. The reflection density characteristics realized after the correction has been performed are shown in FIG. 3(c). In FIGS. 3(b) and 3(c), the absorption wavelengths of Y, M and C coloring materials and the wavelengths of R, G and B of the scanner coincide with one another. If the wavelengths do not coincide with one another, a correction process using, for example, a table is performed.

A step which is performed by the printer engine in the third stage 300 will now be described. Two bits are added to the lower end of the gradation value of image data which has been CMS-converted by the RIP machine so that enlargement 30 of the gradation accuracy from 256 levels to 1024 levels is performed.

Image data converted into 1024 levels is subjected to the correction-value conversion 31 which will sequentially be described. The correction-value conversion 31 includes density calibration for correcting the sensitivity difference of the materials and machines, main scanning directional correction for correcting irregular density in the main scanning direction and a head right-and-left temperature difference correction for correcting change in the density caused from distribution of temperatures of the line-type head.

Initially, the density calibration will now be described. The density calibration is performed because of the following reason.

Figure 4:
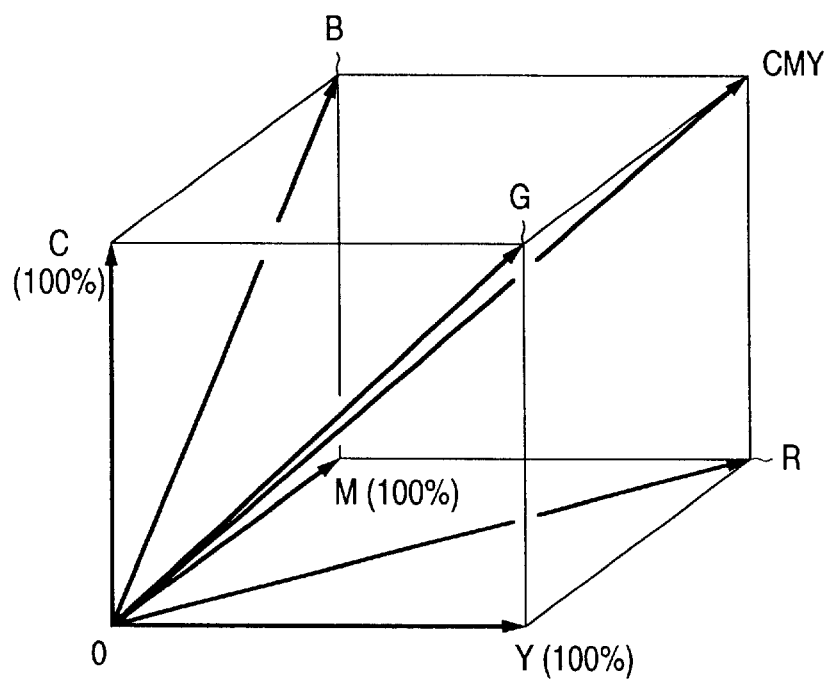
FIG. 4 is a three-dimensional lookup table.
Figure 5:
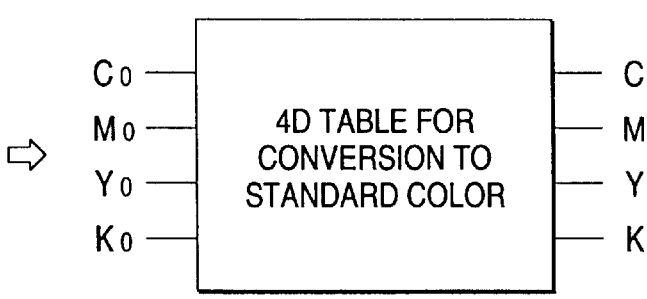
FIG. 5 is a graph showing the relationship among C, M, Y and K after conversion of C0, M0, Y0 and K0 has been performed.
Figure 6:
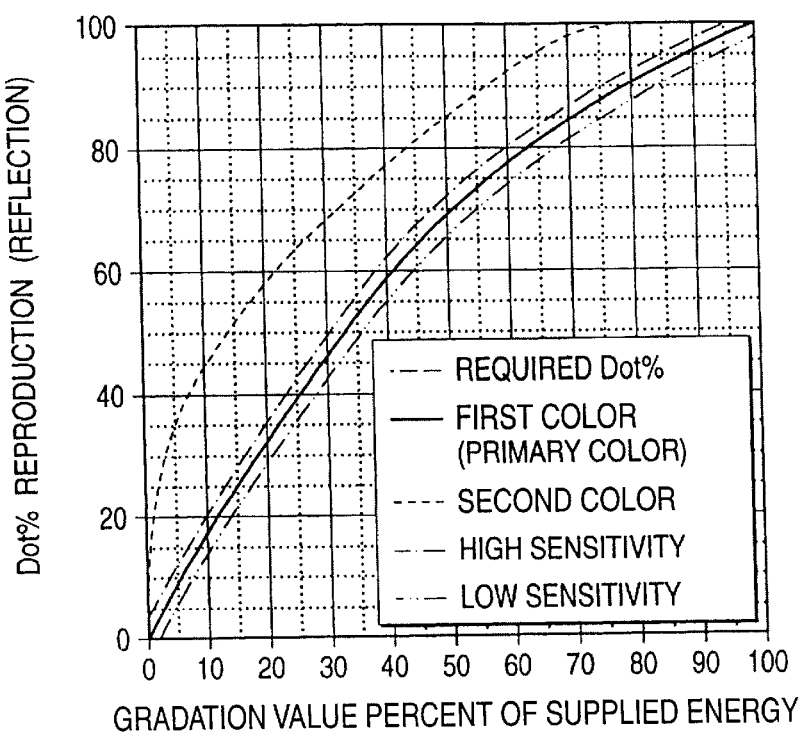
Figure 6:
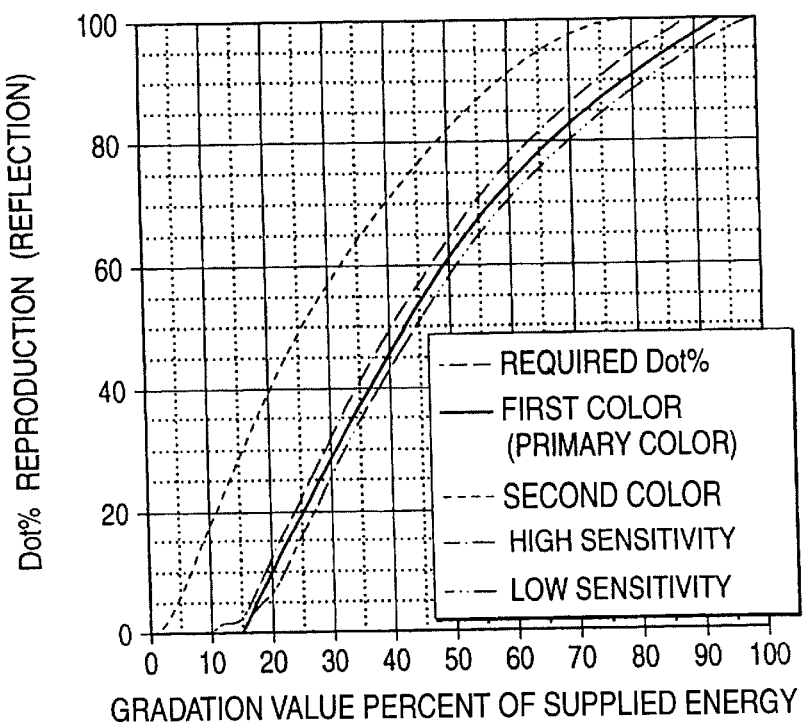
Figure 7:
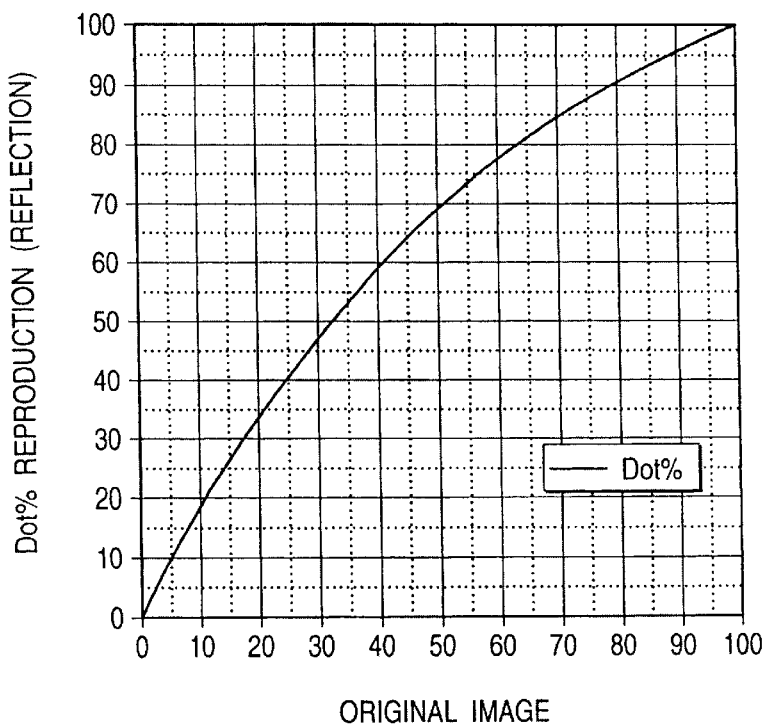
Figure 7:
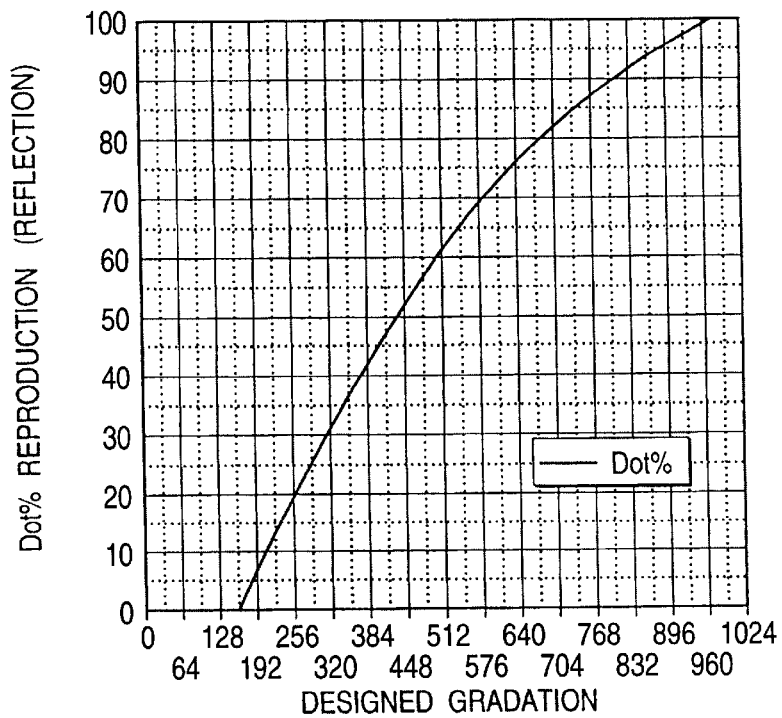
Figure 11:
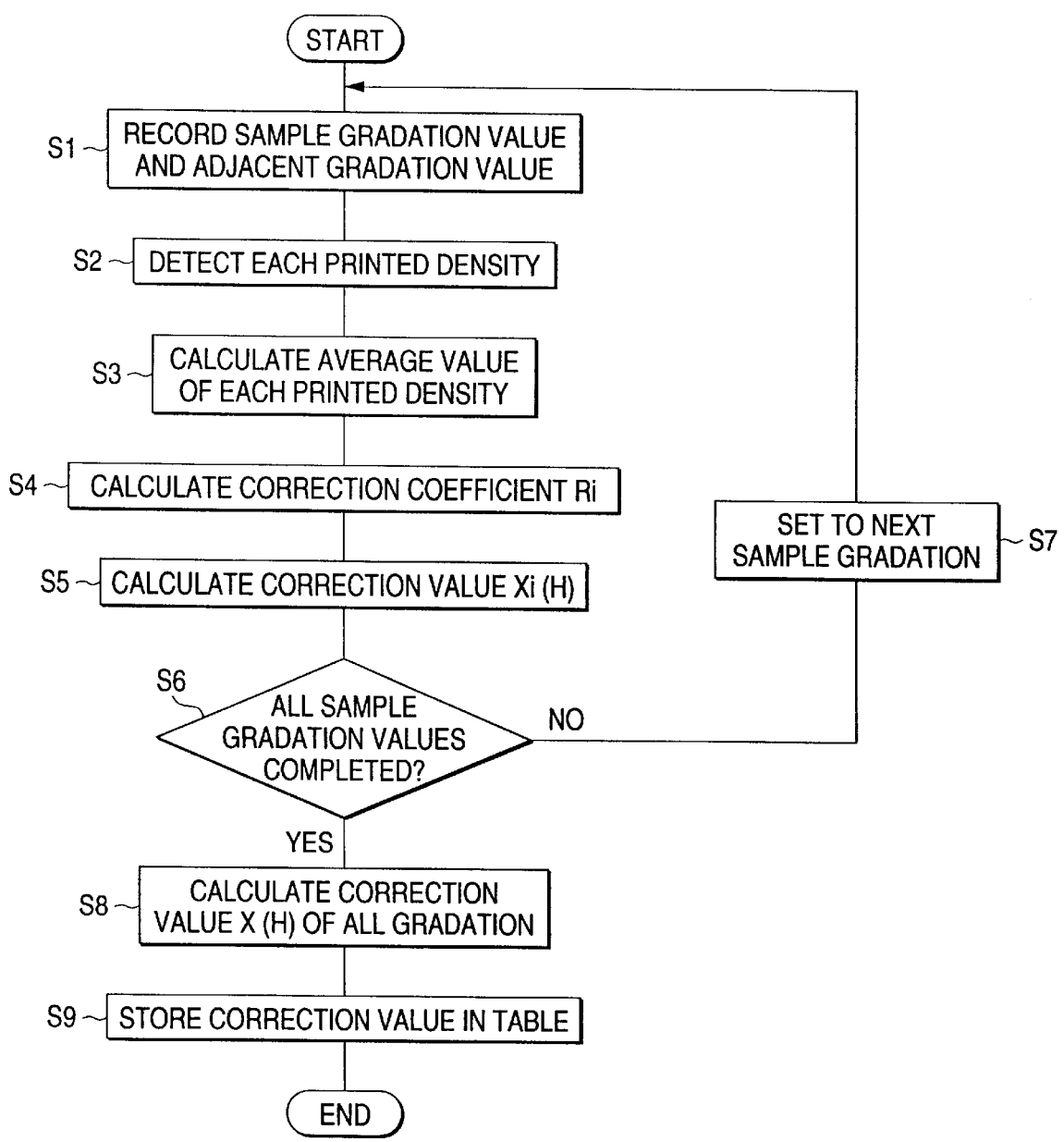
FIG. 11 is a flow chart showing a process for correcting irregular densities.

When color conversion is performed in a case where at least any one of C, M, Y and K is 0%, the color which is 0% is 0% of the overall image. When a color image is formed by Y, M and C, a three-dimensional lookup table formed as shown in FIG. 4 may be employed. That is, a cubic model formed by 0% to 100% of independent Y, M and C axes is employed in which red (R) is located on a diagonal line between Y and M, green (G) is located on a diagonal line between C and Y and blue (B) is located on a diagonal line between M and C. When red (R) approaches M on the Y-M plane, the color is changed to pink. When the red (R) approaches Y, the color is changed to orange. The three-dimensional lookup table containes matrices which change supplied original data C0, M0 and Y0 into Y, M, C. When K (black) is added, a four-dimensional lookup table structured as shown in FIG. 5 is formed. The matrices in the lookup table are determined for all colors of the printed matter and the color printer by actual measurement.

Therefore, when the lookup table of the three-dimensional or higher order obtained by actual measurement is employed to realize a pure color by a color printer, the chromaticity nearer the pure color is sometimes realized in a case where a color except for the pure color is mixed.

When color (for example, C is 0%) free from color mixture is printed by a color printer, color nearer the required color can sometimes be realized when C is, for example, 1% as compared with a case where C is 0%. In the foregoing case, a color proof is produced such that C is 1%. When a user observes the color proof with a magnifier, the user easily detects a fact that C is mixed in a portion in which C is not located (if the portion in which C must be 16% is 17%, the user cannot substantially detect the difference). Thus, there is apprehension that the user may believe that data above is incorrect.

Therefore, if printing is performed such that at least one color of C, Y, M and K is 0% (even in a case where more satisfactory matching of the hue can be realized when the color included by 0% is mixed), the at least one color is made to be 0% in the present invention. The foregoing process is the density calibration.

In the example of the cube, the fact that at least one color of C, M and Y is included by 0% is, for example, the three ridge lines of C, M and Y, the three diagonals B, R, G of the cube, a color (for example, orange) on the plane Y-M, a color (for example, blue purple) on the plane M-C and a color (for example, yellow green) on the plane C-Y. If at least one of C, M and Y is included by 0%, the above-mentioned arrangement is employed.

Specifically, the conversion table for use to perform the density calibration is arranged in such a manner that when at least one of C, M and Y or C, M, Y and K obtained by adding K is 0%, energy for the 0% gradation of the color is fixed. When the above-mentioned conversion table is used to produce a color proof, a user does not make a misunderstanding. If the hue of the pigment is made to significantly be close to the ink for printing, a problem that the hue is changed considerably can be prevented.

The specific process of the density calibration will now be described. A graph shown in FIG. 6(A) shows a curve indicating an object of reproduction of single-color gradient. The axis of abscissa stands for dot percents of an original image, while the axis of ordinate stands for dot percents obtained by performing measurement by using a reflection-type density measurement apparatus. The "dot percent" is also called "half-tone percent" which indicates an area ratio of printed ink. The reflection density is reproduction of dot percent (dot %) by a Murray-Davis's equation. Since the reflection density is determined by using a densitometer, such as a reflection density measurement unit, in place of a special measurement, such as an image analysis, an assumption is made that the amount of an optical dot gain of the color proof is similar to that of color art CR-T3 manufactured by Fuji Photo Film Co., Ltd. In accordance with the reflection density of the color art CT-T3, the dot percent obtained in accordance with the Murray-Davis's equation is employed as an object of the reproduction.

It is ideal (an object) that reproduced area of halftone dot area of the color proof after transference of an output image from a color printer to paper coincides with original image (supplied digital data).

To acheive the above-mentioned object of reproduction in any case, the present invention has a structure that installation to a color printer is performed in such a manner that compression and movement of ends of the gradient shown in a graph shown in FIG. 6(B) are performed. The obtained results are formed into a reproduction curve of a single-color. That is, the graph shown in FIG. 7(B) has a structure that the axis of abscissa is stands for the designed gradation value which is equally divided into 1024 sections. A designed gradation value of 1023 is the largest gradation value (recording energy) for a color printer engine, while a designed gradation value of 0 is the smallest gradation value of the color printer engine. The above-mentioned graph is characterized in that the designed gradation value 976 on the axis of abscissa indicates solid black having a dot reproduction value of 100. Moreover, the designed gradation value 156 on the axis of abscissa indicates highlight having a dot reproduction value of 0. That is, the highlight having the dot percent reproduction value of 0 starts at about a value of 156 in place of starting at 0. Moreover, the solid black having the dot percent reproduction value of 100 is realized when the value is about 976 on the axis of abscissa in place of 1023 on the axis of abscissa. The regions on the axis of abscissa from 0 to 156 and from 976 to 1023 are called margins in this embodiment.

The necessity of the margin will now be described with reference to a graph shown in FIG. 7(A) and a graph shown in FIG. 7(B) showing the present invention.

FIG. 7(A) shows an ideal (object) curve shown in FIG. 6(A) with a solid line. FIG. 7(B) shows an ideal (object) dot percent curve shown in FIG. 6(B) with a solid line.

A high-sensitivity line (alternate long and short dash line) obtained when sensitive material and machine are used is drawn on the left of each of the above-mentioned two lines. Moreover, a low-sensitivity line (alternate long and two short dashes line) obtained when low-sensitive material and machine are used is drawn on the right of each of the above-mentioned two lines. The dot percent is also called a halftone dot % which is an area ratio of printed ink.

As shown in FIG. 7(A), the ideal solid-line curve has a form that the dot percent reproduction is zero when the applied energy is 0%. When applied energy is 100%, also the dot percent reproduction is 100%. However, undesirable change in the dot percent occurs even if the same energy is supplied in case where the materials and machine have differences. If the margins are too small when shadow or highlight is formed, there arises the following problem: if the sensitivity of the material and the machine are too low, the alternate long and two short dashes line on the right of the ideal solid-line curve is employed. In this case, the dot reproduction % is not 100 when the applied energy is 100%. The dot reproduction % is terminated about 97%. That is, there sometimes occurs a case in which the dot percent of 100% which is the full gradation in the shadow portion cannot be realized. If a sensitive material or a sensitive machine is employed, the alternate long and dash line on the left of the ideal solid-line curve is employed. Thus, the dot percent cannot be made to be 0 when the applied energy is 0%. The dot percent is terminated at about 3%. That is, there sometimes occurs a case in which highlight of 0% cannot be realized.

Moreover, there is a tendency that a high sensitivity of the material is realized in the secondary or higher color as compared with a single color (a primary color) (that is, higher dot percent is realized in the second color as compared with the primary color even if the same energy is applied). A line indicating the above-mentioned tendency is shown in FIG. 6(A) with a dashed line. Also in this case, there is the same tendency as that realized when the sensitive material and the machine are employed. Thus, the correction method shown in FIG. 7(A) cannot express highlight.

The correction method shown in FIG. 7(B) having the margin in the lower pressure portion in the graph is able to reproduce dot percent of 0% to 100% even in the case where the low sensitive material and machine are used, in the case where the sensitive material and machine are used and in the case where a secondary color is printed.

Density calibration tables according to the correction method according to the present invention are shown in FIGS. 8 and 9. The foregoing tables have gradation accuracy of the designed gradation value of 1024 levels. In the engine, the gradation value is 0 to 1020 and the dot percent is 0% to 100%. Note that the gradation value in the table is expressed at intervals of 4 levels and the levels in the vicinity of the gradation value at which the calibration output is performed are expressed. As a matter of course, the factors are set for intermediate gradation values.

In this embodiment, the original image has a structure that data of the original image value of 0 is included in a gradation value of 4 (see FIG. 8) in the engine. The upper and lower portions of the foregoing value are blank portions. If the gradation value is not located apart from the foregoing value, a dot is sometimes undesirably added when highlight is expressed when the sensitive material and machine are employed or a secondary color is formed. As for the shadow, data for Y, M and C is apart from 6 steps as the gradation value in the engine when data is 100% after the value has reached 99.6% (see FIG. 9) of the original image. Thus, only when 100% of data is attempted to clearly express solid image, energy can rapidly be enlarged as compared with other data items.

Moreover, K is located lower that Y, M and C. Data when K is 100% is apart from Y, M and C by 12 steps as the gradation value in the engine. Thus, K is supplied with larger energy as compared with Y, M and C.

A density calibration chart with which the density calibration is performed is shown in FIG. 10. As shown in the drawing, the density calibration chart is formed by a plurality of rectangles (hereinafter called "color patches") printed output for each of C, M and Y in a stepped manner from the dot percent density of 0% to 100%. To clearly indicate the density range, the density calibration chart has a structure that a color patch of the highest density (100%) is located at the leading end thereof. Moreover, a color patch of the lowest density (0%) is located to a next position. In addition, the intermediated gradation values are arranged in the descending order.

In a first step of the color density adjustment, the color printer is operated to print a density calibration chart for each of Y, M, C and K at the instructed dot percent. The density of each color patch is measured by the densitometer or the like. If the measure value coincides with an object halftone dot %, no process is performed. If they do not coincide with each other, a density calibration table is produced to make the density coincide with the standard so as to correct original data. The density calibration is performed as described above. That is, if the color is too thin as a result of the measurement performed by using the densitometer, the density calibration table is produced in such a manner that original data is somewhat thickened.

Referring to tables shown in FIGS. 8 and 9, if the density must be somewhat raised as a result of the measurement, the overall figures in the table must be moved downwards by about two rows. If the density is required to be lowered, the overall figures in the table must be moved upwards by about two rows.

FIG. 10 shows a density calibration chart according to the present invention in which the calibrations in the vicinity of the highlight and that of the shadow are fined. The highest density dot percent of 100% is a gradation value of a 1020-th print engine. Moreover, the lowest density dot percent 0% is a gradation value of a 16-th print engine. The intermediate portion is arranged in such a manner that the illustrated intervals are employed from the shadow to the highlight. The gradation values (applied energy) in the print engine are arranged in such a manner that the intervals of the gradation values in the print engine are narrowed in the vicinities of the shadow and the highlight (for example, dot percents 95% to 75% adjacent to the shadow are reduced by the gradation values of 16 to 24 in the print engine and dot percents 30% to 5% adjacent to the highlight are reduced by the gradation values of 12 to 20 in the print engine). In the halftone range, the intervals of the gradation values are widened (for example, dot percents 75% to 40% are reduced by a gradation value of about 80 in the print engine).

The present invention employs the patch for the density calibration having the structure that the calibrations in the vicinities of the highlight and the shadow are fined when a color printing operation is performed. Therefore, (1) addition of a dot to highlight and (2) incomplete collapse in a solid portion which are easily detected by a user in a case of a halftone dot gradation value can be prevented. Even if the intermediate gradation value is somewhat shifted, a greater permissible range is given as compared with the highlight and shadow. Therefore, any program takes place in a practical operation. Patches for the density calibration having the structure that the calibrations in the vicinities of the highlight and the shadow shown in FIG. 10 are indicated with black dots in the tables shown in FIGS. 8 and 9.

After the correction using the density calibration has been performed, the correction of the density irregularity in the main scanning direction is performed. The correction of the density irregularity in the main scanning direction is schematically performed such that the printed density of an image pattern recorded at a predetermined gradation value is detected. In accordance with the ratio of the obtained printed density and the gradation value, a correction value of the gradation value of image data is determined. In accordance with the correction value, image data is corrected. The process for correcting irregular density in the main scanning direction will now be described with reference to a flow chart shown in FIG. 11.

Figure 12:
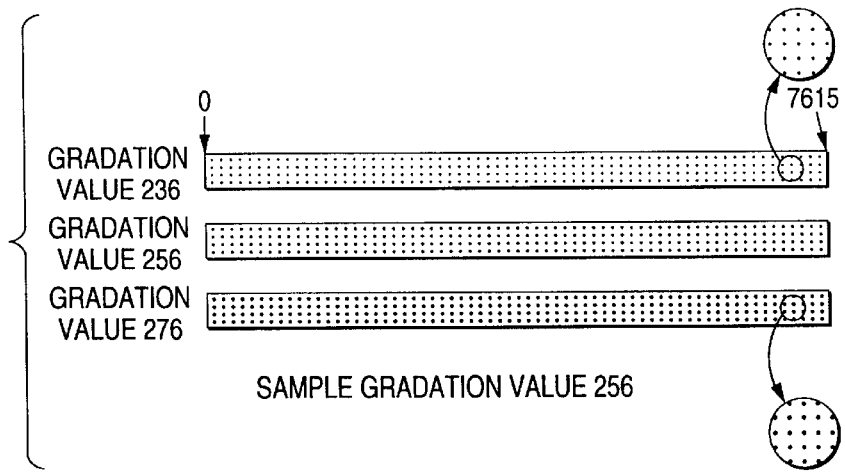
FIGS. 12(a) to 12(c) show an elongated pattern recorded with set gradation values of each sample gradation value.
Figure 12:
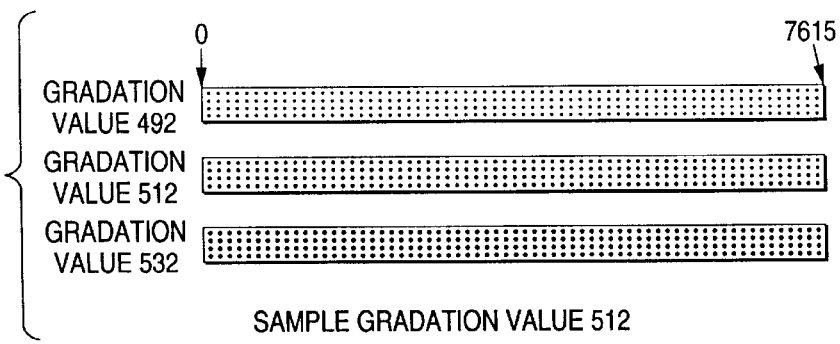
Figure 12:
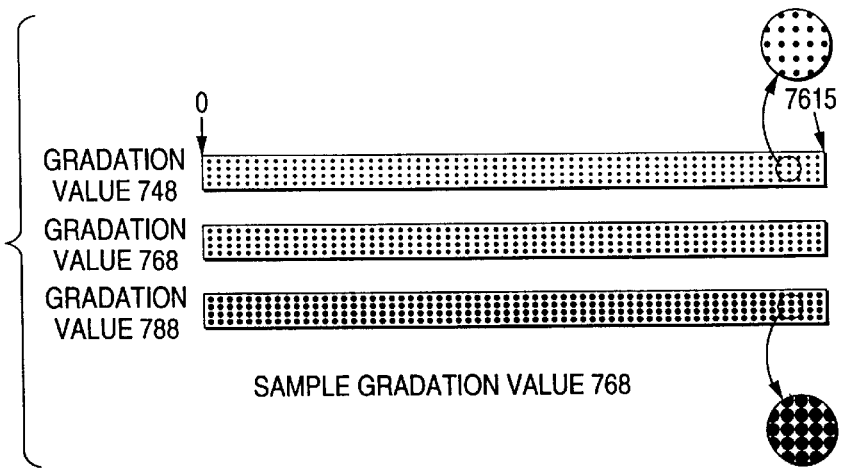

In step 1 (hereinafter expressed as "S1"), elongated image patterns shown in FIG. 12 are recorded at predetermined gradation values by the line type recording head. Since 1024-level image data is printed in this case, three steps 256, 512 and 768 which are intermediate values between 0 and 1023 are selected as sample gradation values Di (i=1 to 3) where D0=0 and D4=1023). The three other sample gradation values D1, D2 and D3 except for the minimum gradation value D0 and the maximum gradation value D4 are provided with three gradation values, which are gradation value Di and gradation values Di±20 obtained by adding or subtracting a predetermined gradation width (for example, five levels) to and from the gradation value Di, that is, Dai (=Di−20), Dbi (=Di) and Dci (=Di+20). That is, one gradation value set formed by three gradation values is provided for one sample gradation value. The gradation value sets are provided for the three sample gradation values so that three sample gradation values, that is, nine gradation values are set.

Although this embodiment has the structure that the three steps (D1, D2 and D3) of the sample gradation values are set, the present invention is not limited to this. The number of steps may be reduced to simply perform the calculation process or enlarged to improve the accuracy of the correction value. Although the predetermined gradation width is 20 gradation, it is preferable that the foregoing value is arbitrarily be changed to be adaptable to image data which must be employed. Moreover, either of the addition or subtraction of the predetermined gradation width may be set so as to perform the following process by using one set formed by the predetermined gradation value and the gradation value obtained by adding or reducing. A plurality of (for example, five gradation values which are a predetermined gradation value ±20 and ±40) gradation values in the vicinity of the sample gradation value may be set. The plurality of the gradation values may be used as one set. It is preferable that the foregoing structure is determined to be adaptable to a required correction accuracy and processing period of time.

FIG. 12(a) shows a result of a recording process by using the three set gradation values provided for the sample gradation value D1, that is, a result of a recording process performed in the main scanning direction (positions of a heat resistor H=0 to 7615) of the printer. Similarly, FIGS. 12(b) and 12(c) show results of recording processes in which the sample gradation values D2 and D3 are used. An ideal printed density in each of the elongated patterns is a uniform density corresponding to the set gradation value which is the gradation value of image data. In actual, the result of the recording process sometimes encounters shift of the printed density from a density corresponding to the set gradation value or undesirable variation in the printed density occurring depending on the recording position. Thus, irregularity in the density in the main scanning direction sometimes takes place.

Figure 13:
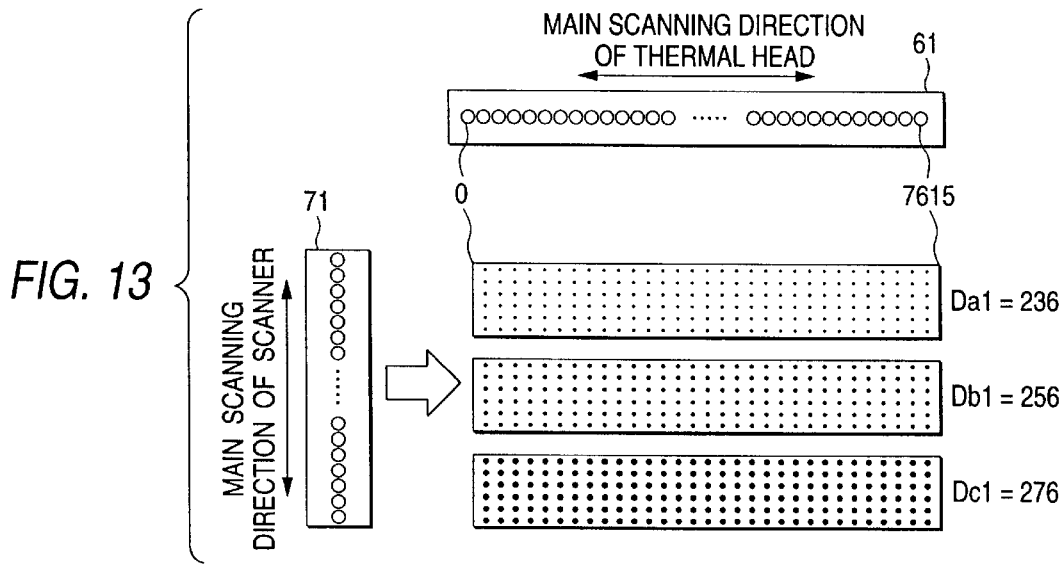
FIG. 13 is a diagram showing the relationship between the main scanning direction of a recording apparatus and the main scanning direction of a scanner.

To simply describe the structure, an example case in which the sample gradation value is 256 (D1 =256) will now be described. The set gradation values, which indicate the gradation values of an image pattern serving as a reference for the correction, are made to be Da1=236 (=D1−20), Db1=256 (=D1) and Dc1+276 (=D1+20). As shown in FIG. 13, patterns of the set gradation values Da1, Db1 and Dc1 are sequentially recorded on the overall surface in the main scanning direction of the recording head (the maximum recording width of the recording head having 7615 recording devices).

In S2 a scanner 71 having a line sensor shown in FIG. 13 is disposed in such a manner that the main scanning direction of the scanner 71 is made to be substantially perpendicular to the main scanning direction of a thermal head 61. The printed density levels La (H), Lb (H) and Lc (H) of each elongated pattern for all pixels (H=0 to 7615 pixels on an assumption that the detectable resolution of the scanner coincides with the arranging intervals of the recording devices) are detected. At this time, the printed density levels La (H), Lb (H) and Lc (H) are obtained by averaging the printed densities (the printed densities at the same H) of several pixels in the width of each elongated pattern. As a result, dispersion of the sensitivity characteristics with respect to the detecting devices of the scanner can be averaged. Moreover, even if a blank portion, black dots, adhesion of dust and so forth of the elongated pattern take place, the printed density can accurately be detected.

If the detectable resolution of the scanner does not coincide with the arranging intervals of the recording devices, a known method for resolution conversion process may be performed. Since the scanner cannot precisely be disposed at the perpendicular position, it is preferable that a position detecting pattern is disposed in the image which must be printed. With reference to the foregoing pattern, the image rotation and the resolution conversion process are performed.

Figure 14:
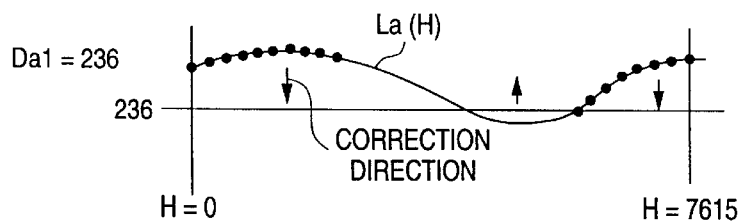
FIGS. 14(a) to 14(c) show distribution of detected printed densities at each set gradation value.
Figure 14:
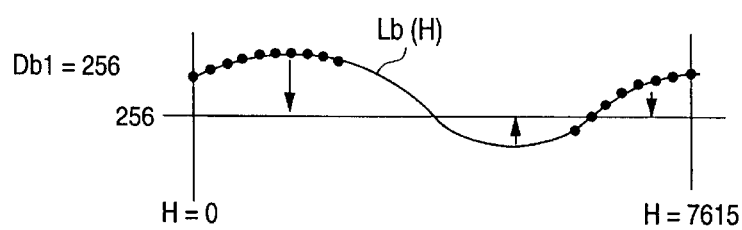
Figure 14:
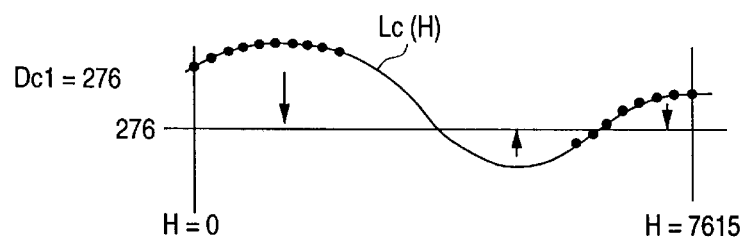

The printed density levels La (H), Lb (H) and Lc (H) obtained by dint of the scanning operation of the scanner 71 result in the density distribution, for example, as shown in FIG. 14. As shown in FIG. 14, the absolute values of the printed density levels La (H), Lb (H) and Lc (H) are deviated from those of the set gradation values Da1, Db1 and Dc1. The amount of the deviation varies among the pixels and among set gradation values. To realize the uniform density corresponding to the set gradation value, the correction process must be performed for each pixel and each gradation value.

In S3 average values LaAv, LbAV and LcAV for all pixel and obtained by averaging the printed density levels La (H) and Lc (H) obtained by dint of the scanning operation of the scanner are obtained. In S4 correction coefficient Ri (where i=1) is obtained. The correction coefficient Ri is a ratio between a gradation value and the printed density in the vicinity of the sample gradation value and obtainable from Equation (1).

$$Ri=(Dci-Dai)/(LcAV-LaAV) \quad (1)$$

Figure 15:
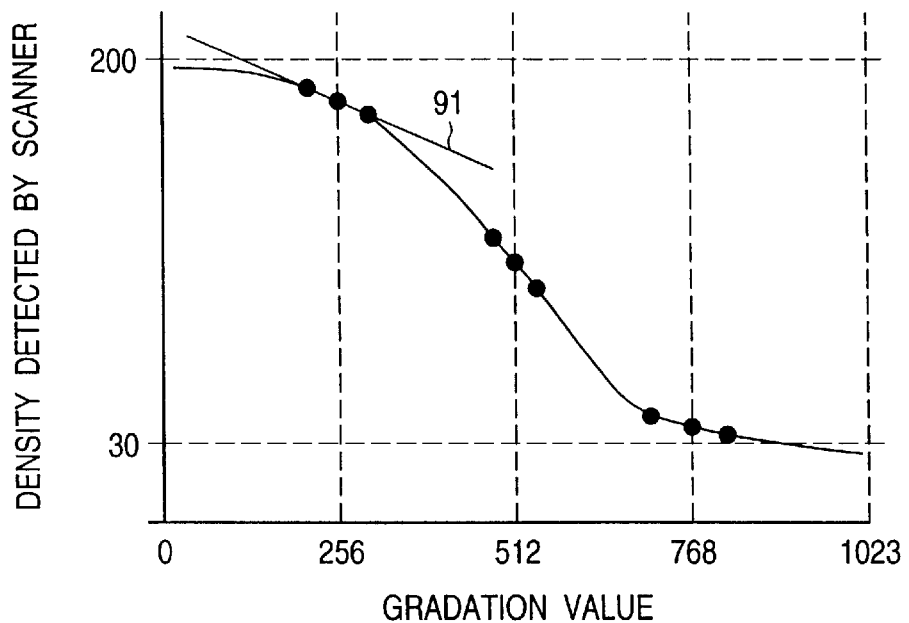
FIG. 15 is a graph showing the relationship between detected densities of the scanner with respect to each set gradation value.

FIG. 15 shows the relationship between the set gradation value and the detectable density of the scanner. Referring to FIG. 15, the correction coefficient Ri indicates change in the detectable density of the scanner in the vicinity of each of the sample gradation values, that is, inclination 91.

In S5, Ri obtained in S4 is used to calculate gradation correction value Xi (H) for appropriately correcting the printed density in accordance with Equation (2).

$$Xi(H)=Di-\{LbAV-Lb(H))\}Ri \quad (2)$$

As a result, the values for correcting the printed densities for all pixels when the sample gradation value D1 is 256 can be obtained.

The process for calculating the gradation correction value Xi (H) is performed for all of the sample gradation values Di (i=1, 2 and 3) (S6, S7). As described above, the scanner is operated to relatively scan the elongated pattern in the lengthwise direction of the elongated pattern so that the printed density is detected. A correction coefficient in accordance with the ratio of the obtained printed density and the gradation value is used to calculate the value for correcting the gradation value. Thus, even if scanners of different types are used or if a scanner which encounters irregularity in the sensitivity characteristic in the main scanning direction is used, the value for correcting the gradation value can accurately be determined.

Figure 16:
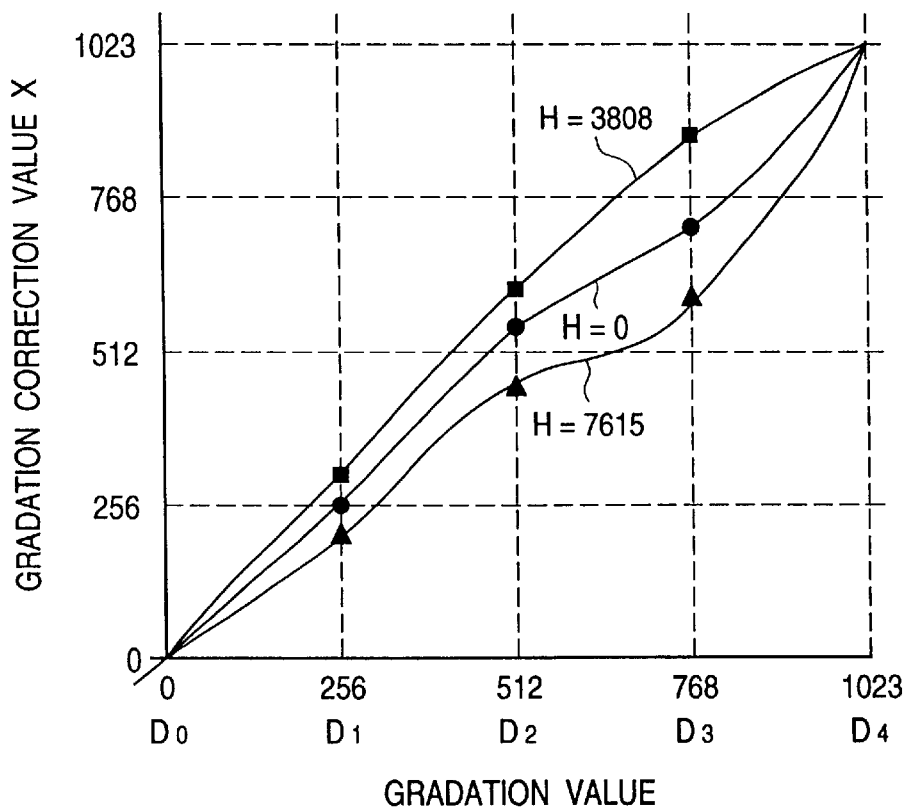
FIG. 16 is a graph showing gradation correction values with respect to gradation values of supplied image data.

After the gradation correction value Xi (H) for all of the sample gradation values Di (i=1, 2 and 3) have been calculated, the gradation correction values for the sample levels Di for all of the pixels can be obtained, as shown in FIG. 16. FIG. 16 shows gradation correction values for only three pixels which are H=0, 3808 and 7615. Note that the gradation correction value for each of the sample gradation values D0 and D4 are set to be 0 and 1023 for all of the pixels.

In S8 gradation correction values x (H) for all of the gradation values are approximately obtained in accordance with the discrete gradation correction values Xi (H) at the sample gradation values obtained in S5. Specifically, gradation correction values X0 (0), X1 (0), X2 (0), X3 (0) and X4 (0) of the same pixel (for example, a pixel of H=0) are used to subject the gradation correction values among sample gradation values to an interpolation process, for example, a linear interpolation, spline interpolation or interpolation using a usual and arbitrary function. Thus, the gradation correction value is inserted so that the gradation correction value x (H) for all of the gradation values is obtained. As a result of the above-mentioned interpolation process, an accurate gradation correction value can be obtained. Thus, the process for calculating the gradation correction value can be simplified.

Figure 17:
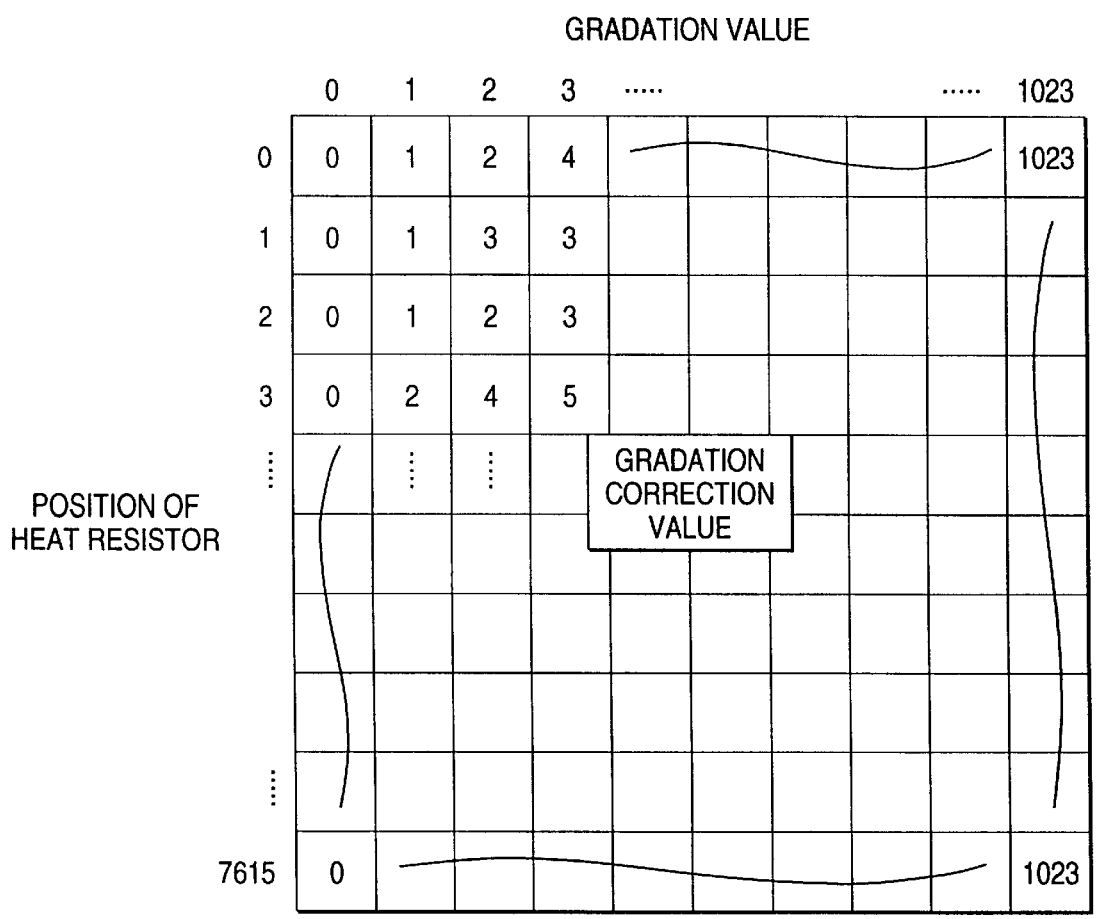
FIG. 17 shows the contents of a correction value table.

In S9 a correspondence table showing gradation correction values x (H) corresponding to all of the gradation values, that is, all of gradation values 0 to 1023 for all of the pixels in the main scanning direction of the recording apparatus as shown in FIG. 17 is stored in the correction table.

Since the gradation correction value is directly set as the gradation value of an image, the gradation correction value must be formed into an integer. As an integer forming process, two following methods will now be described as examples.

A first method is an integer forming method by rounding off a decimal fraction. A second method is a method by using a probabilistic method. If a gradation correction value including all digits to the right of the decimal point is 128.5, the following method may be employed in which the correction value is made to be 128 in a case where the line position in the sub-scanning direction is the even-number line position. If the foregoing direction is the odd-number line position, the correction value is made to be 129. As a specific method of the process, all of the gradation correction values including all digits to the right of the decimal point are multiplied by four. Then, all digits to the right of the decimal point of the correction value multiplied by four are discarded. As a result, the gradation range of the gradation correction values 0 to 1023 is extended to a gradation range from 0 to 4092. That is, a correction value table shown in FIG. 18 is produced. Thus, printed gradation data of the gradation correction values 0 to 1023 is converted into gradation data from 0 to 4092. Then, the value which is determined from values 0 to 3 in accordance with the printing position, is added to the data from 0 to 4092 as the value which must be added, so as to be converted into data of gradation from 0 to 4092. The foregoing value is divided by four, and then all digits to the right of the decimal point are discarded. The value which must be added may be determined by using the matrix shown in FIG. 19. As a result of the above-mentioned process, the gradation correction value is formed into an integer.

Referring to FIG. 19, symbol p corresponds to a remainder of a process for dividing the heater position H by four, while a corresponds to a remainder of a process for dividing the sub-scanning line position by four. If the position of the heater, which is the recording device, is the 105-th position and the sub-scanning line position is the 63-th position, p=1 and a=3. Thus, the value which must be added is determined to be 1 in accordance with FIG. 19.

Therefore, a process for converting the gradation correction value which is 128.3 into an integer is performed such that 128.3 is multiplied with 4. Then, all digits to the right of the decimal point are discarded, causing the correction value to be 513. Then, a value corresponding to the printing position is added with reference to FIG. 19. After the addition has been performed, the value is divided by 4, and then all digits to the right of the decimal point are discarded.

That is, the correction value is converted into 128 at the printing position at which the value which must be added is 0, the same is converted into 128 at the position at which the value which must be added is 1, the same is converted into 128 at the position at which the value which must be added is 2 and the same is converted into 129 at the position at which the value which must be added is 3. Since the values 0 to 3 which must be added appear at the same possibilities, the correction value 128.3 is converted into 128 at a possibility of 3/4 and converted into 129 at a possibility of 1/4.

Although multiplication with 4 and division with 4 have been described, the position of the decimal point varies in the binary notation. Therefore, the actual multiplication and division are not required. When lower 2 bits of values 0 to 1023 expressed by 10 bits are ignored (not connected from a viewpoint of hardware) and only upper 8 bits are used, a process similar to "division with 4 is performed and discarding all digits to the right of the decimal point" can be performed. Therefore, even if a great amount of data can quickly be formed into an integer.

Thus, irregular densities in the main scanning direction can be corrected.

A method of correcting the difference in the temperature between the right-hand end and the left-hand end of the line-type head will now be described. When the temperatures are different from each other between the right-hand end and the left-hand end of the recording head, even image data having the same gradation value results in the difference in the printed density between dots recorded in the high temperature portion and dots recorded in the low temperature portion. Therefore, change in the printed density caused from the difference in the temperature of the device must be prevented. Specifically, temperature sensors are provided at the right and left ends of the recording head and at an intermediate position so as to detect distribution of temperatures of the recording head. Although it is preferable that uniform temperature distribution is detected, the correction table is rewritten to cancel the change in the printed density caused from the difference in the temperature if different temperatures are detected between the right end and the left end of the recording head. Thus, image data is updated. As a result of the correction, even if the temperatures at the right end and the left end are different form each other, undesirable change in the printed density caused from the difference in the temperature can be prevented.

The density calibration correction, the main-scanning directional density irregularity correction, the heat right and left temperature difference correction are included in correction-value conversion 31. The correction tables for the corrections are updated successively, and then stored.

Then, a multivalued dither process 32 is performed with which 1024 gradation value image data is converted into a decreased discrete density levels.

The multivalued dither process 32 is performed such that a matrix is made to correspond to each dot position in units of 150 dpi so as to perform conversion into the gradation value for each dot. The process of the multivalued dither process will now be described.

Figure 20:
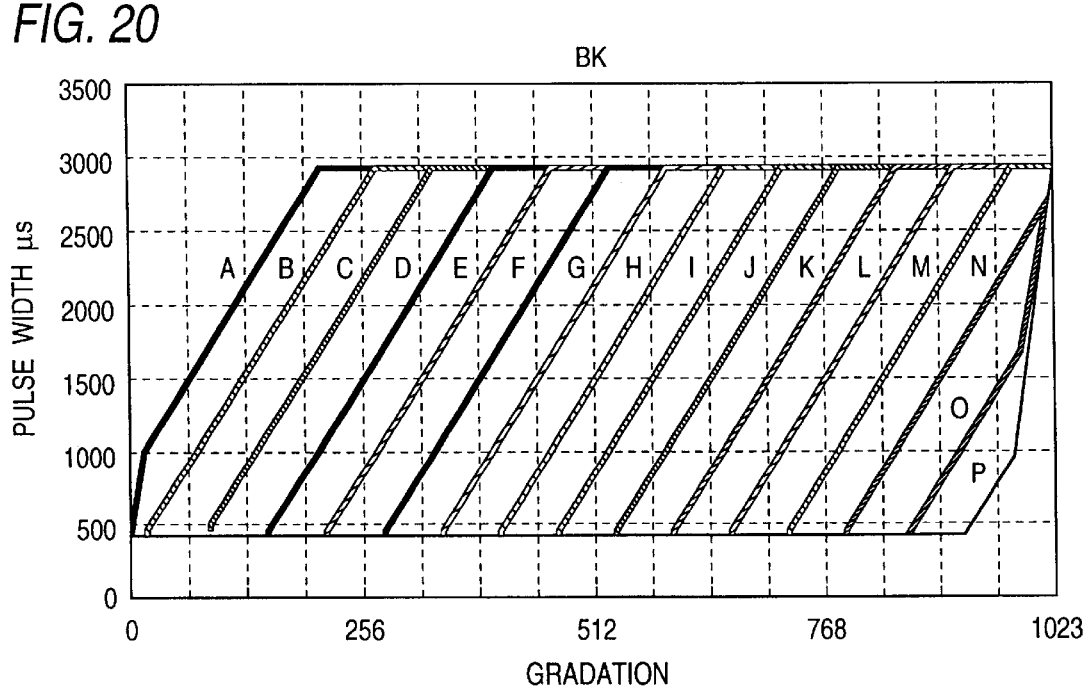
FIG. 20 is a graph showing a conversion characteristic serving as a base for converging the gradation values of B and K.
Figure 21:
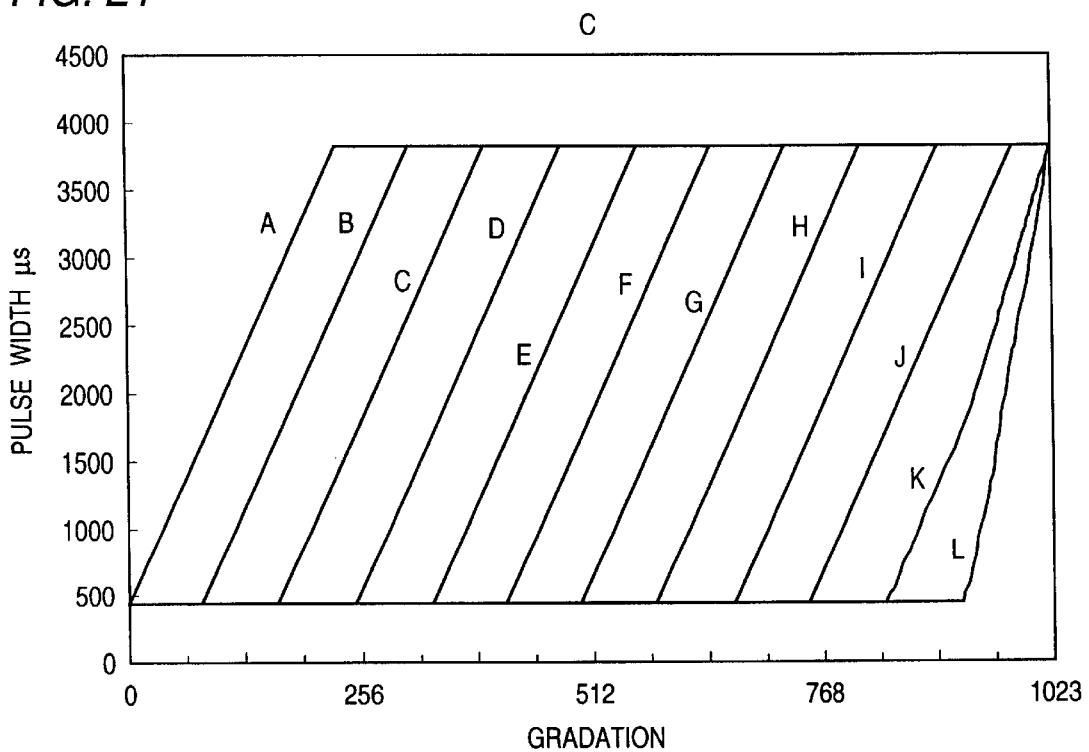
FIG. 21 is a graph showing a conversion characteristic serving as a base for converging the gradation value of C.
Figure 22:
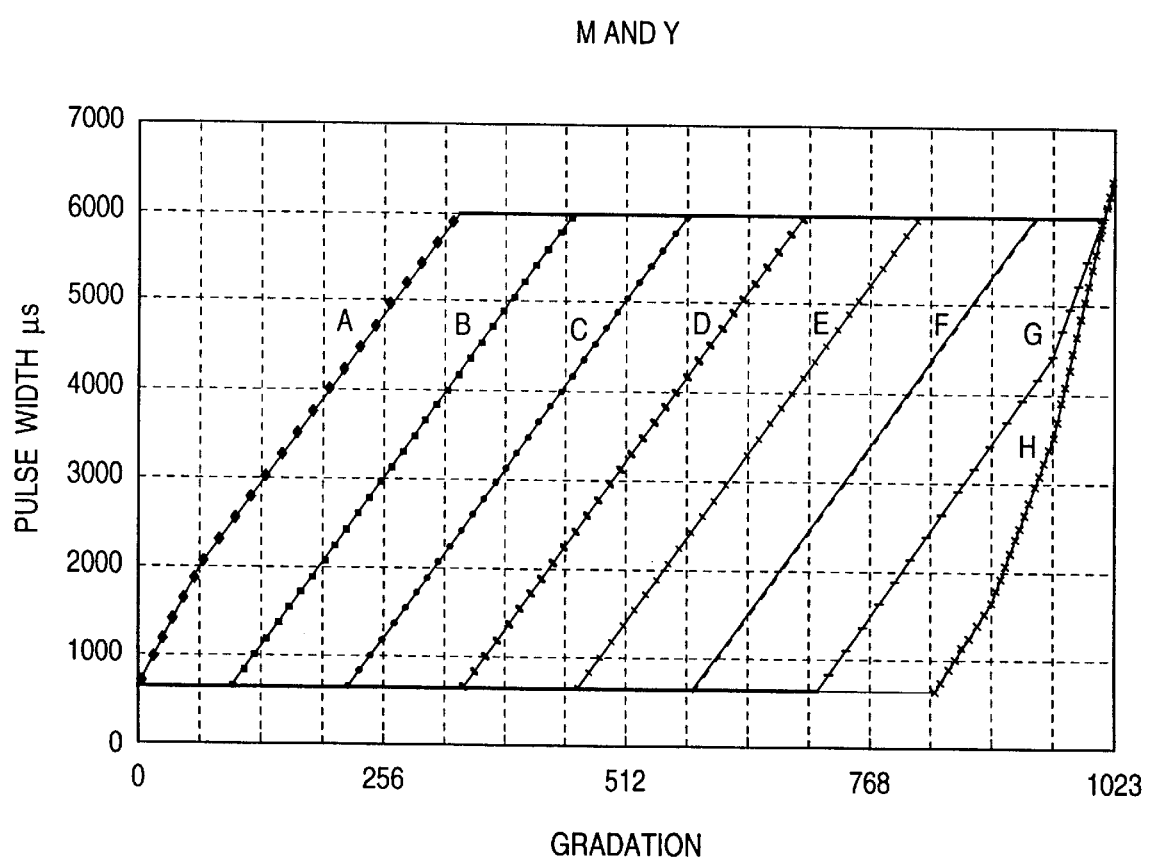
FIG. 22 is a graph showing a conversion characteristic serving as a base for converging the gradation value of M.
Figure 26:
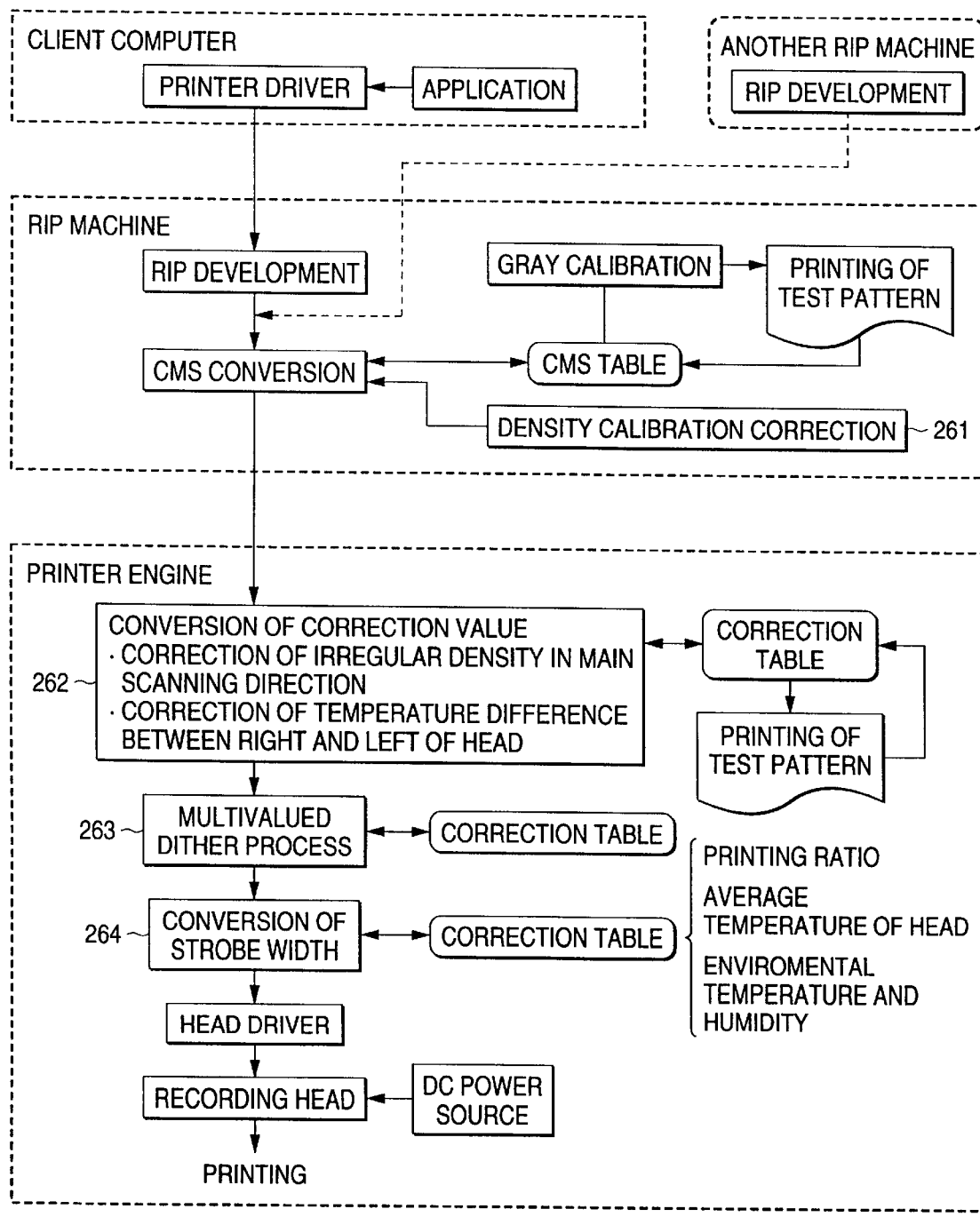
FIG. 26 is a block diagram showing steps of an image correction process according to the related art.

FIGS. 20 to 22 show examples of conversion characteristics serving as the basis of the gradation conversion table. FIG. 20 shows gradation conversion characteristics of BK, FIG. 21 shows those of C and FIG. 22 shows those of M and Y. The axis of abscissa of each of FIGS. 20 to 22 stands for gradation values of supplied image, while the axis of ordinate of the same stands for the width (time) of a recording pulse corresponding to the size of the dot which must be recorded. The gradation value of the supplied image is 1024 (0 to 1023).

The gradation conversion characteristics shown in FIGS. 20 to 22 have at least five (16 lines from A to P in FIG. 20, 12 lines from A to L in FIG. 21 and 8 lines from A to H in FIG. 22) characteristic curves indicating the relationship between the gradation values of the supplied image and the energy for generating a dot which must be recorded.

Each line indicates a growing process from a generation threshold value (a lowermost portion of the line) of the dot which must be recorded.

Each of the gradation conversion characteristics shown in FIGS. 20 to 22 has, in a halftone region, at least three types of characteristic curves having an energy value except for a maximum energy or a minimum energy at a predetermined gradation value. At a maximum gradation value (1023), the energy of the characteristic curve is made to be somewhat higher than that in the other gradation regions (190 $\mu$s in FIG. 20, 220 $\mu$s in FIG. 21 and 300 $\mu$s in FIG. 22). As a result, the collapse characteristic of a "solid" portion can be improved.

At a minimum gradation value at which a printing point at which the energy becomes substantially maximum, the number of the printing points at each of which the energy is substantially minimum is not smaller than half of all of printing points.

FIGS. 23 to 25 shows matrices indicating a conversion curve which must be selected from a plurality of energy conversion characteristics. FIG. 23 shows a matrix for BK, FIG. 24 shows a matrix for C and FIG. 25 shows a matrix for M. Elements in the matrix correspond to printing points. When the matrices are periodically repeated vertically and horizontally, a gradation-printing point energy conversion curve (a characteristic curve) for the printing points over the image can be determined. A value "0" of the element in each matrix is a printing point at which substantially no energy is added for all of the gradation values. Values "1", "2", "3", . . . , are printing points corresponding to characteristic curves "A", "B", "C", . . . , shown in FIGS. 20 to 22. In the matrix in each color, the resolution in the main scanning direction is 600 dpi, that in the sub-scanning direction is 1200 dpi (K), 900 dpi (C) and 600 dpi (M) and the size of the number of the elements is 4×8 (K), 4×6 (C) and 4×4 (M).

The matrix for Y has the same element number size (4×4) and the same resolution (600 dpi in the main scanning direction and 600 dpi in the sub-scanning direction). The matrix for Y is a matrix structured in such a manner that the positions of the matrix elements except for "0" are, in a random number manner, varied for each matrix. Thus, the printing point characteristic curve of the overall image is determined.

When the size and resolution of each matrix have been determined, the actual size (which is not the number of elements and which is the length in an actual space) of the matrix on the image is made to be the same regardless of the color.

As described above, a large number of gradation-printing point energy conversion curves (characteristic curves) are set. Moreover, three or more types of printing points having an intermediate energy value except for the maximum energy or the minimum energy are set. Therefore, the continuity of the gradation values can easily and stably be realized.

In the foregoing embodiment, K dots which must be recorded have been described. A similar process is performed for C, M and Y. When a multicolor image is realized by superimposing the foregoing colors, the sub-scanning periods for the colors are set to be different periods. When the positions of the dots, which must be recorded, are set at different positions among the colors, the continuity of the gradation values can be improved. Even if the alignment of the colors are deviated from one another, a sense of incompatibility for the sense of sight can be prevented.

Similarly to the multivalued dither process according to the present invention, an image forming apparatus is disclosed in Japanese Patent No. 2608808. In the foregoing disclosure, a structure is employed in which the gradation conversion table has four characteristic curves and two types of "energy values exist in a halftone region which is not a maximum energy or a minimum energy". However, the above-mentioned apparatus cannot stably realize continuity of the gradation values if a recording material having a thin ink layer is used in the printing operation. That is, even if a condition is detected at certain temperature and humidity under which tone jump in a gradation image can be prevented to be visible level or lower, the tone jump exceeds the visible level if the temperature and/or the humidity is changed. Therefore, a fact has been confirmed that a satisfactory effect cannot be obtained.

Therefore, when an image is printed on a recording material having a thin ink layer, the gradation conversion table has at least five characteristic curves. Moreover, at least three types of energy values are provided in the halftone region which are not a maximum energy or a minimum energy. Thus, a satisfactory effect can be obtained when a recording material having a thin ink layer is employed.

As a result of the above-mentioned multivalued dither process, image data having 1024 gradation is converted into image data having 64 to 128 gradation. Note that the dither process may be performed by zigzag omission conversion or converted into solid to be adaptable to adjacent data.

Then, strobe conversion 33 is performed for the purpose of converting the image gradation value into a strobe pulse which is supplied to the recording head. That is, 64 to 128 gradation image data subjected to the multivalued dither process is converted into a strobe pulse signal for turning on/off a recording device of a recording head. At this time, the correction table is rewritten to be adaptable to a printing ratio and an average temperature of the recording head so that image data is updated.

The correction adaptable to the printing ratio is performed to prevent a problem in that a substantial printed density is lowered (the area of the dot is reduced) because the voltage is undesirably lowered by dint of increase in electric currents which mainly flow in a common electrode in a case where the recording devices through which electric currents simultaneously flow increase. The foregoing correction is performed such that combinations of the number of recording devices through which electric currents simultaneously flow and the ratio of reduction in the printed density are previously examined. The results are formed into a correction table to which a reference is made.

The correction of the average temperature of the recording head will now be described. If the recording head is, for example, a thermal head, the printed density is changed to correspond to the temperature of the recording head. Thus, the temperature of the recording head is detected. To make the relationship between supplied gradation value data and the printed density to be constant, correction is performed to correspond to change in the temperature. The foregoing correction is performed by making a reference to a predetermined correction table.

After the above-mentioned correction and conversion have been performed, a head driver 34 converts each dot strobe signal into a head input sequence so as to produce an output to a recording head 35.

The recording head 35 is supplied with electric power from a DC power source 36, the voltage of which is controlled in accordance with the environmental temperatures, humidity and set conditions. Then, an image is printed by the recording head 36.

In general, when the environmental temperature is raised, the actual density is raised (the area of a dot is enlarged). To maintain a constant printed density even if the environmental temperature and humidity are changed, the energy which must be supplied to the recording head must be corrected. The method of correcting the energy includes a method of controlling the width of each energizing pulses (time) and a method of controlling electric power (the voltage) which must be supplied. When the gradation is controlled by the size of the dot as is performed in this embodiment, control of the energy with the width of the energizing pulse sometimes causes the aspect ratios of dots having the same area to be changed if the temperature and/or the humidity is changed. For example, a dot in the form of a complete round at room temperatures and humidity is deformed such that the width of the dot in the main scanning direction is enlarged and the length of the same in the sub-scanning direction is reduced when enlargement in the area of the dot is inhibited by shortening the width of the energizing pulse in a hot and wet environment.

If the energy conversion is performed by controlling the electric power which must be supplied, the change in the aspect ratio of the dot occurring when the correction is performed can be prevented. As a result, a printing operation adaptable to the environmental temperatures and humidity can be performed such that a satisfactory dot shape is realized.

The method of correcting image data, and the image correction method which is capable of preventing gradation skip occurring when a data correction process is performed are structured as described above. The image correction method according to the present invention is not limited to the foregoing embodiment. For example, the gradation accuracy conversion, the conversion of the correction value and the multivalued dither process, which are performed by a printer engine, may be performed in a RIP machine. Moreover, the order of the processes which must be performed after the gradation accuracy conversion has been performed may be changed as required. The structure of the foregoing embodiment may be applied to an image printer for outputting a multivalued dither image, such as a direct thermal printer, an electrophotographic printer and an ink jet printer.

EXAMPLES

Effects of the above-mentioned corrections were confirmed by the following color printer.

Conditions:
Recording Head—Resolution in the main scanning direction: 604.8 dpi
Size of heater: 32 μm in the main scanning direction and 40 μm in the sub-scanning direction
Resistance of Head—3000 Ω
Supplied Voltage—9 V
Image Receiving Sheet—Receiver sheet A3W for digital color proofer FirstProof manufactured by Fuji Photo Film Co. Ltd.
Thermal Transfer Ribbon—Proof ribbon for digital color proofer FirstProof manufactured by Fuji Photo Film Co. Ltd.

The image receiving sheet and the thermal transfer ribbon were recording materials adapted to the thin-film thermal transfer method. The material for use in the foregoing method had a structure that the thickness of a coloring material of the ink ribbon was not larger than 1 μm, preferable about 0.3 μm. Therefore, the material had a high resolution as compared with the material for use in the other thermal transfer method. Thus, fine dots can stably be formed.

When images were printed under the foregoing conditions, a satisfactory result was obtained because no gradation skip was not observed.

According to the present invention, the gradation accuracy of the number of gradation of supplied 256 gradation image data is improved from 256 levels to 1024 levels after the CMS conversion has been performed. Then, image data having the improved gradation accuracy is subjected to the correction processes and the multivalued dither process. Therefore, the correction process and the like are performed in a state where the gradation width has been fined. Therefore, gradation skips caused from the bit step occurring during the data correction process can satisfactorily be prevented. Moreover, an image having an excellent quality can be printed because irregularity can be prevented and tone matching can be realized.

The gradation accuracy of image data having the improved gradation accuracy is reduced by the dither process, and then image data is printed. Therefore, any delicate control of the line-type recording head is not required. Moreover, deterioration in the reproducibility of an image and reduction in the image recording speed during the image printing process can be prevented.

What is claimed is:

1. An image correction method in which supplied image data is converted into image data to be output by a printing apparatus using a line-type head, the image correction method comprising steps of:
   CMS-converting the supplied image data in three dimensional or higher order;
   increasing gradation accuracy of image data after the CMS conversion is performed;
   performing a process of correcting image data, the gradation accuracy of which is increased;
   performing a multivalued dither process; and
   converting processed image data into a strobe signal with which the line-type head is controlled;
   wherein the gradation accuracy of CMS-converted image data is the same as the gradation accuracy of the supplied image data.

2. An image correction method according to claim 1, wherein the correction process includes any one of:
   main-scanning-directional density irregularity correction for correcting irregular density in a main scanning direction of the line-type head,
   density calibration correction, and
   head right-and-left temperature difference correction for correcting change in a printing density occurring by dint of the temperature difference between the right and left of the line-type head.

3. An image correction method according to claim 1, wherein the multivalued dither process is performed to record the gradation by converting input image data into recording dots having different sizes, and a conversion of a density level of image data into the size of the recording dot is performed such that
   at least five lines of characteristic curves of a gradation conversion table indicating the relationship between gradation values and energy for forming the recording dot are set,
   at least three types of energy values which are not maximum or minimum energy at a predetermined gradation value are set for a half tone image, and
   a number of printing points having substantially minimum energy is set to be not smaller than half of the number of all of printing points at a minimum gradation value at which a printing point having substantially maximum energy exists.

4. An image correction method according to claim 2, wherein the multivalued dither process is performed to record the gradation by converting input image data into recording dots having different sizes, and a conversion of a density level of image data into the size of the recording dot is performed such that
   at least five lines of characteristic curves of a gradation conversion table indicating the relationship between gradation values and energy for forming the recording dot are set,
   at least three types of energy values which are not maximum or minimum energy at a predetermined gradation value are set for a half tone image, and a number of printing points having substantially minimum energy is set to be not smaller than half of the number of all of printing points at a minimum gradation value at which a printing point having substantially maximum energy exists.

5. An image correction method according to claim 1, wherein power supply voltage which is supplied to the line-type head is corrected in accordance with the atmosphere including a temperature and humidity.

6. An image correction method according to claim 2, wherein power supply voltage which is supplied to the line-type head is corrected in accordance with the atmosphere including a temperature and humidity.

7. An image correction method according to claim 3, wherein power supply voltage which is supplied to the line-type head is corrected in accordance with the atmosphere including a temperature and humidity.

8. An image correction method according to claim 4, wherein power supply voltage which is supplied to the line-type head is corrected in accordance with the atmosphere including a temperature and humidity.

9. An image correction method according to claim 1, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

10. An image correction method according to claim 2, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

11. An image correction method according to claim 3, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

12. An image correction method according to claim 4, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

13. An image correction method according to claim 5, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

14. An image correction method according to claim 6, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

15. An image correction method according to claim 7, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

16. An image correction method according to claim 8, wherein a plurality of gray charts including a first gray pattern formed by C, M and Y and a second gray pattern formed by K in such a manner that a required color tone of the first gray pattern is realized and corresponding to different densities are prepared, a density of each gray chart is read by a color scanner to measure characteristics of reflection intensities with respect to wavelengths, and a CMS table to which a reference is made when the CMS conversion is performed is corrected in accordance with the measured characteristics of the reflection intensities.

17. An image correction method according to any one of claims 2 to 16, wherein the main-scanning-directional density irregularity correction is performed such that an elongated pattern having a predetermined gradation value is printed in the main scanning direction of the line-type head, aligning a main scanning-direction of a line sensor to a sub-scanning direction of the line-type head, and the line sensor is relatively moved in the main scanning direction of the line-type head so that the density of the printed elongated pattern is detected, correction conditions for positions of pixels are obtained in accordance with the detected densities of printing and the predetermined gradation value, and image data which must be output is corrected in accordance with the correction conditions.

18. An image correction method according to any one of claims 1 to 16, wherein a thermal transfer recording material is employed which includes a substantially transparent thermosensitive ink layer which contains 30 parts by weight of pigment and 25 parts by weight to 60 parts by weight of organic amorphous high molecular-weight polymers having a softening point of 40° C. to 150° C. and which has a thickness of 0.2 $\mu$m to 1.0 $\mu$m, 70% or more pigment in the thermosensitive ink layer has a particle size of 1.0 $\mu$m or greater, and an optical reflection density of a transferred image on a white support member is not smaller than 1.0.

* * * * *